US012586374B2

(12) United States Patent
Wang et al.

(10) Patent No.: US 12,586,374 B2
(45) Date of Patent: Mar. 24, 2026

(54) MULTIMODAL VIDEO SUMMARIZATION

(71) Applicant: Adobe Inc., San Jose, CA (US)

(72) Inventors: Zhaowen Wang, San Jose, CA (US); Trung Bui, San Jose, CA (US); Bo He, College Park, MD (US)

(73) Assignee: Adobe Inc., San Jose, CA (US)

( * ) Notice: Subject to any disclaimer, the term of this patent is extended or adjusted under 35 U.S.C. 154(b) by 268 days.

(21) Appl. No.: 18/328,597

(22) Filed: Jun. 2, 2023

(65) Prior Publication Data

US 2024/0404283 A1     Dec. 5, 2024

(51) Int. Cl.
| | |
|---|---|
| *G06V 20/40* | (2022.01) |
| *G06F 40/166* | (2020.01) |
| *G06F 40/40* | (2020.01) |
| *G06V 10/774* | (2022.01) |
| *G06V 10/776* | (2022.01) |
| *G06V 10/80* | (2022.01) |

(52) U.S. Cl.
CPC ............ *G06V 20/47* (2022.01); *G06F 40/166* (2020.01); *G06F 40/40* (2020.01); *G06V 10/774* (2022.01); *G06V 10/776* (2022.01); *G06V 10/803* (2022.01)

(58) Field of Classification Search
None
See application file for complete search history.

(56) References Cited

U.S. PATENT DOCUMENTS

2022/0189173 A1 *   6/2022   Zhou ...................... G06V 10/80

OTHER PUBLICATIONS

He, Bo, et al. "Align and Attend: Multimodal Summarization with Dual Contrastive Losses." arXiv preprint arXiv:2303.07284 (2023). (Year: 2023).*
Huang, Jia-Hong, and Marcel Worring. "Query-controllable video summarization." Proceedings of the 2020 International Conference on Multimedia Retrieval. 2020. (Year: 2020).*
Patrick, Mandela, et al. "On compositions of transformations in contrastive self-supervised learning." Proceedings of the IEEE/CVF International Conference on Computer Vision. 2021. (Year: 2021).*
Shang, Xindi, et al. "Multimodal video summarization via time-aware transformers." Proceedings of the 29th ACM International Conference on Multimedia. 2021. (Year: 2021).*
Xie, Jiehang, et al. "Multimodal-based and aesthetic-guided narrative video summarization." IEEE Transactions on Multimedia 25 (2022): 4894-4908. (Year: 2022).*
Xu, Yumo, and Mirella Lapata. "Coarse-to-fine query focused multi-document summarization." Proceedings of the 2020 Conference on empirical methods in natural language processing (EMNLP). 2020. (Year: 2020).*

(Continued)

*Primary Examiner* — Sean M Conner
(74) *Attorney, Agent, or Firm* — Nicholson De Vos Webster & Elliott LLP

(57)     ABSTRACT

A method includes receiving a video input and a text transcription of the video input. The video input includes a plurality of frames and the text transcription includes a plurality of sentences. The method further includes determining, by a multimodal summarization model, a subset of key frames of the plurality of frames and a subset of key sentences of the plurality of sentences. The method further includes providing a summary of the video input and a summary of the text transcription based on the subset of key frames and the subset of key sentences.

20 Claims, 11 Drawing Sheets

(56) References Cited

OTHER PUBLICATIONS

Ye, Linwei, et al. "Referring segmentation in images and videos with cross-modal self-attention network." IEEE Transactions on Pattern Analysis and Machine Intelligence 44.7 (2021): 3719-3732. (Year: 2021).*

Zolfaghari, Mohammadreza, et al. "Crossclr: Cross-modal contrastive learning for multi-modal video representations." Proceedings of the IEEE/CVF international conference on computer vision. 2021. (Year: 2021).*

Fu, Xiyan, Jun Wang, and Zhenglu Yang. "Mm-avs: A full-scale dataset for multi-modal summarization." Proceedings of the 2021 Conference of the North American Chapter of the Association for Computational Linguistics: Human Language Technologies. 2021. (Year: 2021).*

Qiao, Lingfeng, et al. "Grafting pre-trained models for multimodal headline generation." arXiv preprint arXiv:2211.07210 (2022). (Year: 2022).*

Avila, de et al., "VSUMM: A mechanism designed to produce static video summaries and a novel evaluation method", Pattern Recognition Letters, vol. 32, 2011, pp. 56-68.

Chen, J., et al., "Abstractive Text-Image Summarization Using Multi-Modal Attentional Hierarchical RNN", Proceedings of the 2018 Conference on Empirical Methods in Natural Language Processing, 2018, pp. 4046-4056.

Cheng, J., et al., "Neural Summarization by Extracting Sentences and Words", arXiv:1603.07252v3, Jul. 1, 2016, 11 pages.

Coltheart, M., "The MRC Psycholinguistic Database", Quarterly Journal of Experimental Psychology, 1981, pp. 497-505.

Derek Miller, "Leveraging BERT for Extractive Text Summarization on Lectures", arXiv:1906.04165, 2019, 7 pages.

Deschacht, K., et al., "Text Analysis for Automatic Image Annotation", Proceedings of the 45th Annual Meeting of the Association of Computational Linguistics, Jun. 2007, pp. 1000-1007.

Fajtl, J., et al., "Summarizing Videos with Attention", arXiv:1812. 01969v2, Feb. 21, 2019, pp. 1-16.

Fu, X., et al., "MM-AVS: A Full-Scale Dataset for Multi-modal Summarization", Proceedings of the 2021 Conference of the North American Chapter of the Association for Computational Linguistics: Human Language Technologies, 2021, pp. 5922-5926.

Fu, X., et al., "Multi-modal Summarization for Video-containing Documents", arXiv:2009.08018v1, Sep. 17, 2020, 10 pages.

Fu., T. J., et al., "Attentive and Adversarial Learning for Video Summarization", IEEE Winter Conference on Applications of Computer Vision (WACV), 2019, 9 pages.

He, B., et al., "ASM-Loc: Action-aware Segment Modeling for Weakly-Supervised Temporal Action Localization", Proceedings of the IEEE/CVF Conference on Computer Vision and Pattern Recognition (CVPR), 2022, pp. 1-13.

He, B., et al., "GTA: Global Temporal Attention for Video Action Understanding", arXiv:2012.08510v3, Nov. 2, 2021, pp. 1-19.

Jeong, J. W., et al., "Towards Measruing the Visualness of a Concept", Proceedings of the 21st ACM international conference on Information and knowledge management, Oct. 2012, pp. 2415-2418.

Jiang, H., et al., "Joint Video Summarization and Moment Localization by Cross-Task Sample Transfer", Proceedings of the IEEE/CVF Conference on Computer Vision and Pattern Recognition (CVPR), 2022, pp. 16388-16398.

Khullar, A., et al., "MAST: Multimodal Abstractive Summarization with Trimodal Hierarchical Attention", arXiv:2010.08021v1, Oct. 15, 2020, 10 pages.

Lewis, M., et al., "BART: Denoising Sequence-to-Sequence Pretraining for Natural Language Generation, Translation, and Comprehension", Proceedings of the 58th Annual Meeting of the Association for Computational Linguistics, 2020, pp. 7871-7880.

Li, H., et al., "Multi-modal Sentence Summarization with Modality Attention and Image Filtering", Proceedings of the Twenty-Seventh International Joint Conference on Artificial Intelligence (IJCAI-18), 2018, pp. 4152-4158.

Li, H., et al., "Multi-modal Summarization for Asynchronous Collection of Text, Image, Audio and Video", Proceedings of the 2017 Conference on Empirical Methods in Natural Language Processing, 2017, pp. 1092-1102.

Li, M., et al., "VMSMO: Learning to Generate Multimodal Summary for Video-based News Articles", arXiv:2010.05406v1, Oct. 12, 2020, 10 pages.

Louis, A., et al., "What Makes Writing Great? First Experiments on Article Quality Prediction in the Science Journalism Domain", Transactions of the Association for Computational Linguistics, vol. 1, 2013, pp. 341-352.

Nallapati, R., et al., "SummaRuNNer: A Recurrent Neural Network Based Sequence Model for Extractive Summarization of Documents", Proceedings of the Thirty-First AAAI Conference on Artificial Intelligence (AAAI-17), vol. 31, No. 1, 2017, pp. 3075-3081.

Narasimhan, M., et al., "CLIP-It! Language-Guided Video Summarization", arXiv:2107.00650v2, Dec. 8, 2021, pp. 1-15.

Park, J., et al., "SumGraph: Video Summarization via Recursive Graph Modeling", arXiv:2007.08809v1, Jul. 17, 2020, pp. 1-16.

Rochan, M., et al., "Video Summarization Using Fully Convolutional Sequence Networks", Proceedings of the European Conference on Computer Vision (ECCV), 2018, pp. 347-363.

Wang, X., et al., "Non-local Neural Networks", Proceedings of the IEEE Conference on Computer Vision and Pattern Recognition (CVPR), 2018, pp. 7794-7803.

Zhang, K., et al., "Video Summarization with Long Short-term Memory", arXiv:1605.08110v2, Jul. 29, 2016, pp. 1-24.

Zhao, B., et al., "Reconstructive Sequence-Graph Network for Video Summarization", arXiv:2105.04066v1, May 10, 2021, pp. 1-10.

Zhong, M., et al., "Extractive Summarization as Text Matching", arXiv:2004.08795v1, Apr. 19, 2020, 12 pages.

Zhou, K., et al., "Deep Reinforcement Learning for Unsupervised Video Summarization with Diversity-Representativeness Reward", The Thirty-Second AAAI Conference on Artificial Intelligence (AAAI-18), 2018, pp. 7582-7589.

Zhu, J., et al., "MSMO: Multimodal Summarization with Multimodal Output", Proceedings of the 2018 Conference on Empirical Methods in Natural Language Processing, 2018, pp. 4154-4164.

Zhu, W., et al., "DSNet: A Flexible Detect-to-Summarize Network for Video Summarization", IEEE Transactions On Image Processing, vol. 30, 2021, pp. 948-962.

* cited by examiner

INTER-SAMPLE CONTRASTIVE LOSS POSITIVE/NEGATIVE PAIRS

| | [CLST]1 | [CLST]2 | ... | [CLST]B |
|---|---|---|---|---|
| [CLSV]1 | V1T1 | V1T2 | ... | V1TB |
| [CLSV]2 | V2T1 | V2T2 | ... | V2TB |
| ... | | | ... | |
| [CLSV]B | VBT1 | VBT2 | ... | VBTB |

1000

```
┌─────────────────────────────────────────────────┐
│ RECEIVING A VIDEO INPUT AND A TEXT TRANSCRIPTION │
│ OF THE VIDEO INPUT, WHEREIN THE VIDEO INPUT      │
│ INCLUDES A PLURALITY OF FRAMES AND THE TEXT      │
│ TRANSCRIPTION INCLUDES A PLURALITY OF            │
│ SENTENCES 1002                                   │
└─────────────────────────────────────────────────┘
                         │
                         ▼
┌─────────────────────────────────────────────────┐
│ DETERMINING, BY A MULTIMODAL SUMMARIZATION       │
│ MODEL, A SUBSET OF KEY FRAMES OF THE PLURALITY   │
│ OF FRAMES AND A SUBSET OF KEY SENTENCES OF THE   │
│ PLURALITY OF SENTENCES                           │
│ 1004                                             │
└─────────────────────────────────────────────────┘
                         │
                         ▼
┌─────────────────────────────────────────────────┐
│ PROVIDING A SUMMARY OF THE VIDEO INPUT AND A     │
│ SUMMARY OF THE TEXT TRANSCRIPTION BASED ON THE   │
│ SUBSET OF KEY FRAMES AND THE SUBSET OF KEY       │
│ SENTENCES  1006                                  │
└─────────────────────────────────────────────────┘
```

*FIG. 10*

MULTIMODAL VIDEO SUMMARIZATION

BACKGROUND

The ability to easily capture videos has resulted in an explosive growth of storing videos online. Many videos stored online are livestream videos in which videos are captured and stored without significant editing. As livestream videos are generally unaltered, livestream videos can be long and can contain irrelevant or redundant information. Summarizing a livestream video is an alternative to viewing the entirety of the video and can include a summary of relevant key frames of the original video or a short textual description of the video. The summarization of livestream videos can provide an efficient mechanism of browsing online videos for desired content.

SUMMARY

Introduced herein are techniques/technologies that generate a video summary using a multimodal video summarization system. The multimodal video summarization system generates a multimodal video summary by selecting the most important parts of each received input modality (e.g., video, text, audio). The multimodal video summarization system of the present disclosure capitalizes on the temporal correspondence between different modalities by implementing an alignment-guided self-attention module. The alignment-guided self-attention model leverages aligned video inputs and text transcript inputs in the temporal domain to fuse the multimodality inputs.

Training the multimodal video summarizer system is performed in an end-to-end manner by back propagating three different types of losses. A classification loss is used to train a score predictor to predict whether video frames and text are relevant with respect to the video summarization. Video frames and text that are identified as being relevant receive high "relevancy" scores and are output as a subset of video frames and text that are used to summarize the video. Additionally, the multimodal summarized is trained using two different contrastive losses to model both inter-sample and intra-sample correlation. Learning the intrinsic correlation between the video modality and the text modality using dual contrastive learning enhances the multimodal video summarization system's ability to localize key frames and text of an input video and corresponding transcribed text. Additionally, training the multimodal video summarization system with dual contrastive losses provides more self-supervision signals than training the multimodal video summarization system with either intra-sample loss or inter-sample loss.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which:

FIG. 7 illustrates the positive and negative pairs used to train the multimodal video summarization system for inter-sample contrastive loss, according to some embodiments;

FIG. 10 illustrates a flowchart of a series of acts in a method of performing multimodal video summarization in accordance with one or more embodiments.

DETAILED DESCRIPTION

One or more embodiments of the present disclosure include a multimodal summarization system to produce reliable and high quality multimodal summaries using multimodal inputs. Most conventional systems employ multimodal summarization and output a unimodal output such as a video summary or a text summary. Some conventional systems employ multimodal summarization and output a multimodal output. However, when determining the multimodal output, such conventional system treat the video modality and text modality separately. Additionally, conventional systems performing multimodal summarization generally adopt strategies such as sequence modeling and attention operation, demanding a large amount of training data (e.g., annotated multimodal data) to sufficiently train the multimodal summarizer.

To address these and other deficiencies in conventional systems, the multimodal video summarization system of the present disclosure aligns the temporal and video modalities using an alignment-guided self-attention module, improving the learned correspondence between the two different modalities. As a result, the multimodal summarization output is more reliable and a higher quality over conventional systems. Additionally, the multimodal video summarization system of the present disclosure is a supervised system that leverages dual contrastive learning losses. Training the multimodal video summarization system using two contrastive losses allows the multimodal summarization system to learn how to summarize multimodal data without requiring a large amount of annotated multimodal training data.

The multimodal video summarization system of the present disclosure improves the ability of a user to efficiently find a relevant video. As a result of efficiently finding a video, computing resources are conserved. The multimodal video summarization system provides reliable and accurate key frames and text summaries of a video. Providing both key video frames and key sentences to the user allows the user to better understand the concepts included in the video, without having to watch the entirety of the video. The effective summarization of a video reduces computing resources associated with a user browsing through multiple videos to find a desired video by allowing a user to identify the desired video more quickly and effectively. Additionally, computing resources are not wasted on finding and displaying videos that end up being irrelevant to the user.

Figure 1:
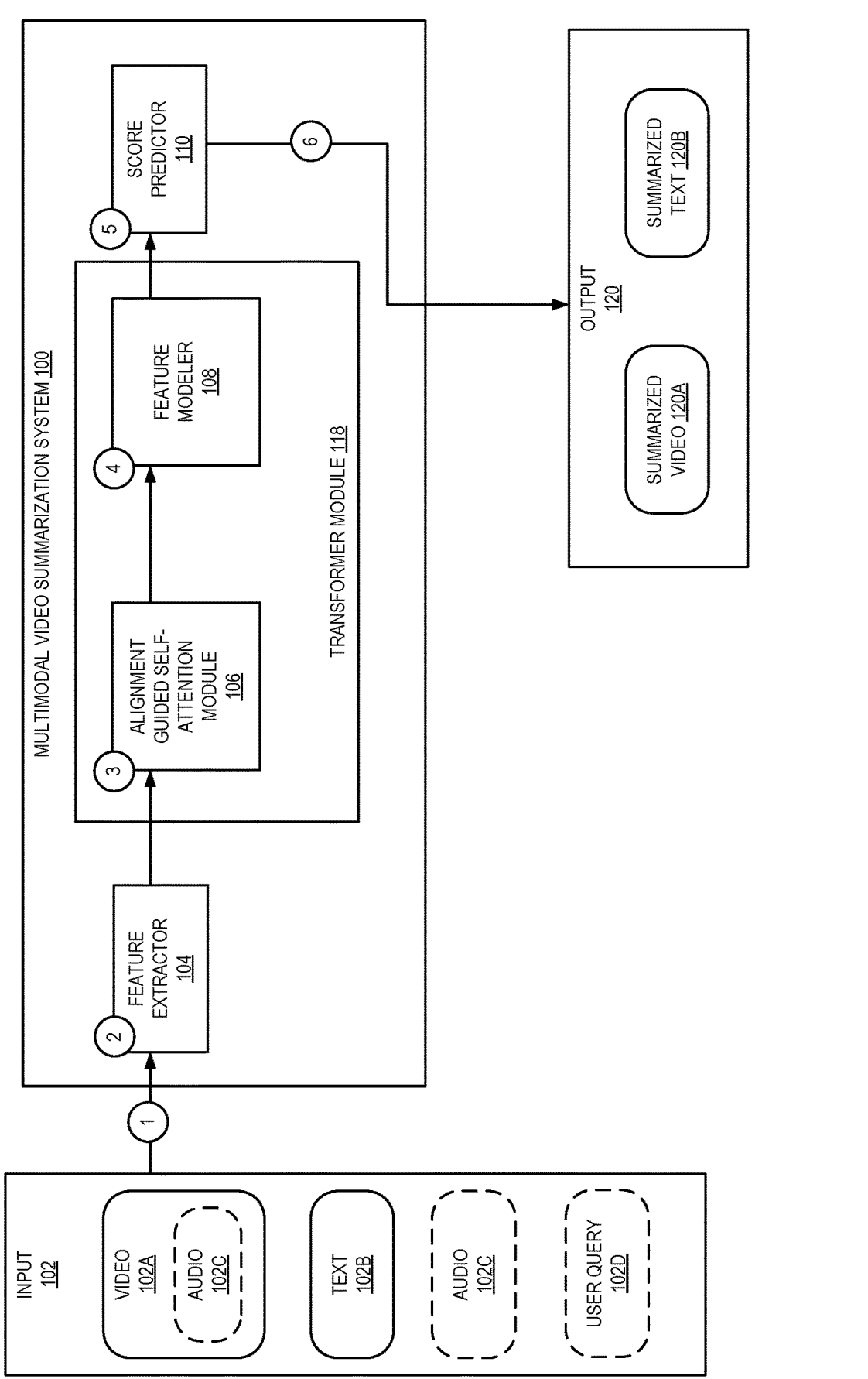
FIG. 1 illustrates a diagram of a process of multimodal video summarization, in accordance with one or more embodiments.

FIG. 1 illustrates a diagram of a process of multimodal video summarization system, in accordance with one or more embodiments. A multimodal video summarization system 100 receives inputs associated with a video across multiple modalities and outputs a summarization of the video using multiple modalities. The multimodal video summarization system 100 is a transformer-based architecture used for multimodal summarization. As shown, the multimodal video summarization system 100 includes a feature extractor 104, a transformer module 118, and a score predictor 110. The transformer module 118 includes an alignment guided self-attention module 106 and a feature modeler 108. At numeral 1, the multimodal input 102 is passed to the multimodal video summarization system 100. Input 102 is a multimodal input including both a video 102A and text 102B. The video 102A can include any digital visual media including a plurality of frames which, when played, includes a moving visual representation of a story and/or an event. In some embodiments, the video 102A includes an audio component 102C. In other embodiments, the input 102 includes an audio component such as audio 102C. For ease of description, the video 102A includes an audio component 102C such that the input 102 includes a multimodal input of video, text, and audio. In some embodiments, the video 102A is a livestream video. Livestream videos have several distinctive characteristics over other types of videos. For example, the background of the livestream video is generally static, meaning the background frames of the livestream video appear visually similar and/or change slowly over time. In contrast, videos other than livestream videos may be edited videos such that the videos are of a shorter duration and include a variety in scene transitions.

The text 102B is a text transcript of the video 102A. The text 102B associated with the video 102A can include a description of intelligible language produced by one or more speakers in the video 120A, the background noises in the video, and the like. The text 102B may be parsed into text at the sentence level, speaker level, phrase level (e.g., one or more sentences), turns in a conversation, according to a duration of time, and the like, and include timestamps of the transcribed video. For ease of description the "text" described in the present disclosure includes sentences of a transcript derived using the video 102A, however it should be appreciated that other granularities of text can be processed. In one embodiment, the text 120B is a sentence level transcript of the video 102A, where each transcribed sentence is associated with a start time and an end time. For example, a sentence spoken by a speaker can include a start time when the speaker started the sentence, and an end time when the speaker finished the sentence. The text 102B is provided as input 102 using any speech to text processing that may be performed as an upstream process. Generally, text 102B determined from a livestream video, as compared to other edited videos, is longer (based on the longer duration of the livestream video) and includes redundant and/or irrelevant information. It should be appreciated that text 102B is roughly temporally aligned with video 102A. For example, there is a temporal alignment between video frames and a description of the video corresponding to the video frames. While transcripts may describe content slightly before or after the corresponding visual content is displayed in the video, systems and methods described herein assume the rough temporal alignment of the video 102A and the text 102B.

In some embodiments, the input 102 may include a user query 102D. The user query 102D is an additional text input but is distinguished from text 102B that transcribes the video 102A. An example user query 102D may be a user prompt asking about content of the video 102A. For example, a user query 102D may be a prompt asking if the video 102A includes/describes a particular concept, when a particular concept is described in the video 120A (e.g., at what time stamp), and the like. When the input 102 includes a user query 102D, the multimodal video summarization system 100 is considered a "query focused multimodal video summarization system," because the summarized video 120A and summarized text 120B will be biased towards answering the user query 102D. That is, the summarized video 120A and summarized text 120B are dependent on the user query 102D in a query focused multimodal video summarization system. As a result, the key frames and key sentences identified by the multimodal video summarization system are directed to responding to the user query 102D.

At numeral 2, the feature extractor 104 extracts features of input 102 (including video 102A and text 102B). In some embodiments, the feature extractor 104 tokenizes one or more frames of video 102 and one or more sentences of text 102B. In some embodiments, the feature extractor 104 prepends a token to each video and text transcript. The feature extractor 104 distinguishes frames/sentences of different livestream videos using a token such as the conventional classification CLS token prepended to one or more feature embedding (e.g., each feature embedding, the first video feature embedding, the first text feature embedding, etc.). For example, CLSV1 may represent a set of feature embeddings associated with each video frame of a sequence of video frames of a first video (e.g., a first video input 102A). Similarly, CLST1 may represent a set of feature embeddings associated with each text sentence of text of a first text transcript (e.g., a first text 102B associated with video input 102A).

The feature extractor 104 encodes the input 102 into a vector representation, enabling downstream modules (e.g., the alignment guided self-attention module 106, the feature modeler 108, and the score predictor 110) to learn relationships of the video frames and text. The feature extractor 104 is described in more detail with reference to FIG. 2. As described herein, the feature extractor 104 determines segment embeddings, which are includes concatenated, temporally aligned video embeddings and text embeddings.

The segment embeddings associated with the input video 102A and corresponding text 102B passed to the transformer module 118. The transformer module 118 may be a machine learning architecture that is used when solving sequence tasks. Specifically, the transformer module 118 performs attention and outputs a vector representation weighing each element in a sequence (e.g., each frame of multiple video frames in video input 102A, each text in multiple texts of text 102B).

At numeral 3, the alignment guided self-attention module 106 of the transformer module 118 locally attends the segment embeddings (e.g., the temporally aligned embeddings in the video and text domain). In some embodiments, the alignment guided self-attention module 106 receives concatenated user query embeddings appended to text embeddings and video embeddings, as described in more detail in FIG. 2. Receiving such a concatenated input is different from conventional methods which simply fuse query information by cross-attention operations.

Instead of global cross-attention, the alignment guided self-attention module 106 performs cross-attention of segments. Applying global cross-attention, as is conventionally performed in transformers, may introduce extra noise to the multimodal fusion process because livestream videos have static/irrelevant background. Globally attending multiple modalities in the livestream video context may result in attending irrelevant information, while also unnecessarily increasing the consumption of computing resources when attending the irrelevant information.

The alignment guided self-attention module 106 performs cross-attention between modalities within the same segment to fuse multiple modalities. For example, the alignment guided self-attention module 106 performs local attention using one or more segment embeddings including video and corresponding text, as described with reference to FIG. 3. Leveraging the aligned temporal correspondence between the video and text modalities allows the alignment guided self-attention module 106 to produce more accurate cross-modality attention weights when fusing cross-modal information. The fused cross-modality is performed in a symmetric manner (e.g., fusing text with corresponding video according to the same temporal duration), allowing features from both modalities to be learned together.

As shown, the transformer module 118 includes one alignment guided self-attention module 106. However, in some embodiments, the alignment guided self-attention module 106 is multi-headed. A multi-headed alignment guided self-attention module 106 means that each head of the multi-headed alignment guided self-attention module performs the operations of the alignment guided self-attention module 106 in parallel. In this manner, the alignment guided self-attention module 106 attends different segment embeddings in parallel, increasing the computational efficiency of the transformer module 118.

At numeral 4, the feature modeler 108 captures information from each modality (e.g., the video modality and the text modality) using a fused modality matrix. Specifically, the feature modeler 108 employs multiple expert branches to capture single modality information from the fused modality matrix. The feature modeler 108 is described in more detail with reference to FIG. 4.

As shown, the alignment guided self-attention module 106 and feature modeler 108 are included in the transformer module 118. While only one alignment guided self-attention module 106 and feature modeler 108 are shown, it should be appreciated that the transformer module 118 may execute multiple alignment guided self-attention modules 106 and feature modelers 108. By stacking layers of the alignment guided self-attention module 106 and the feature modeler 108 in the transformer module 118, the multimodal video summarization system 100 is able to capture hierarchical features to better learn the complex dependencies of the video domain and the text domain.

At numeral 5, the score predictor 110 assigns a relevance score of the frames/text in each modality using a vector representation of the video frames in the video modality and a vector representation of the text in the text modality. Specifically, the score predictor 110 employs a unique head to score a relevance of a vector representation of content in a unique modality. The score predictor 110 is described in more detail with reference to FIG. 4.

At numeral 6, the output 120 may be displayed to a user via a computing device, saved in one or more files, uploaded to one or more servers, and the like. The output 120 is a multimodal summarization of the input 102. The score predictor 110 determines a subset of frames that are identified as relevant given the input video 102A. The subset of frames become the summarized video 120A of output 120. In other words, the summarized video frames 120A are extracted frames from video 102A. For example, given multiple frames of a video (e.g., video 102A), the score predictor 110 identifies a subset of frames that are key frames used to summarize the video. The key frames (e.g., summarized video 120A) are the frames that receive the highest score determined by the score predictor 110.

The score predictor 110 also identifies text that is identified as relevant given the input text 102B. For example, given multiple sentences of a video transcription (e.g., text 102B), the score predictor 110 identifies a subset of sentences that are key sentences used to summarize the video. The relevant text becomes the summarized text 120B of output 120. In other words, the summarized text 120B is the text of 102B associated with the highest score determined by the score predictor 110.

In some embodiments, the score predictor 110 concatenates the key text sentences to generate the summarized text 120B. In other embodiments, the multimodal summarization system 100 executes one or more machine learning models (such as any language model) to generate a refined/comprehensive text summary. For example, as opposed to concatenating sentences/phrases of text received as summarized text 120B, a language model (not shown) receives the summarized text 120B as a prompt and refines the summarized text 120B by adding punctuation, transitional language, removing redundant words, and the like.

When the input 102 includes the user query 102D and the multimodal video summarization system 100 performs a query-focused video summarization, the output 120 outputs query-related key frames and key sentences. Specifically, the summarized video frames 120A includes a subset of frames that are query-related and identified from the video 102A. For example, such frames are the frames that receive the highest score determined by the score predictor 110. The summarized text 120B is a subset of text that are query-related and identified from the text 102B. For example, the query-related summarized text 120B is the text of 102B associated with the highest score determined by the score predictor 110.

Figure 2:
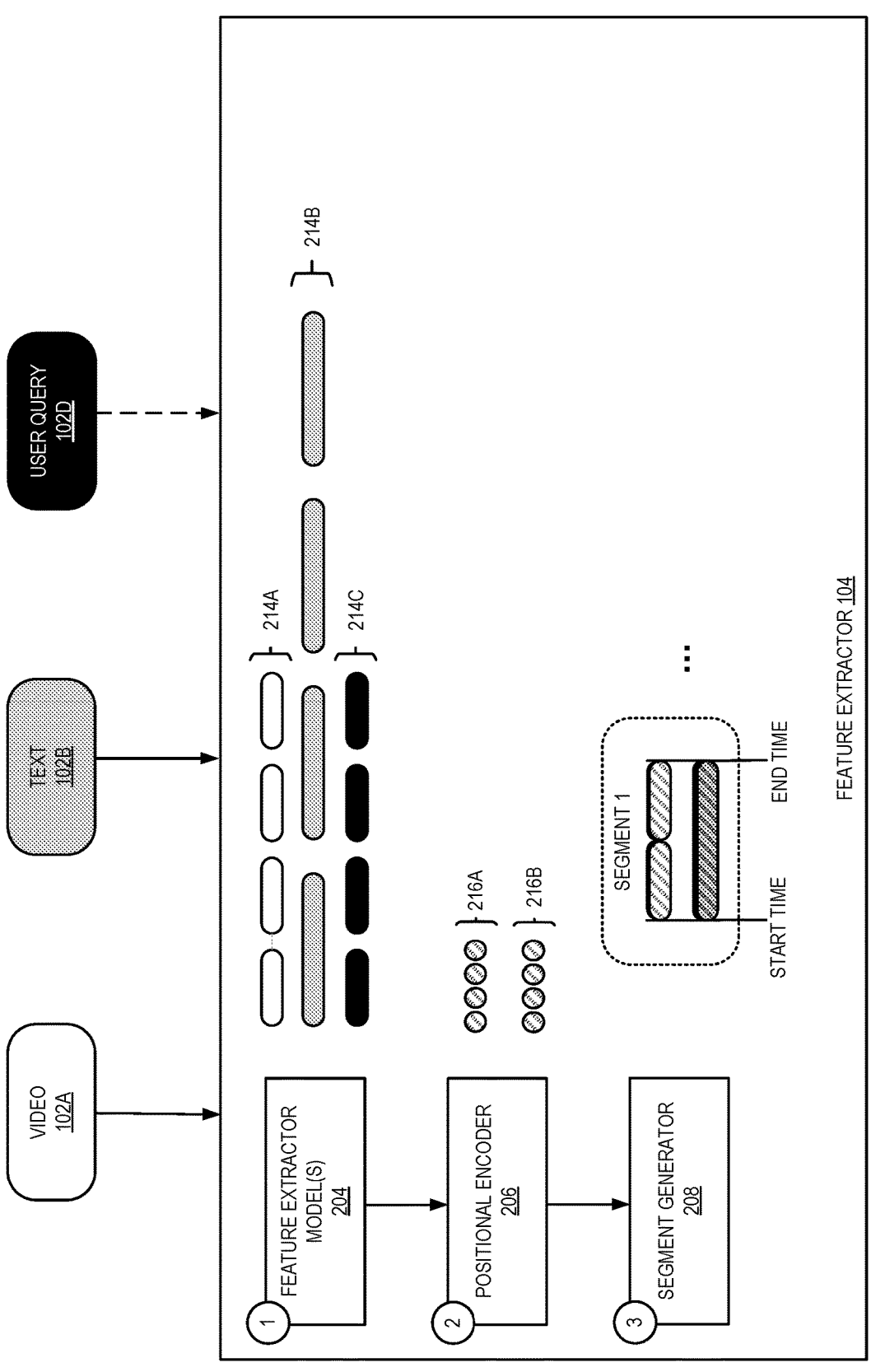
FIG. 2 illustrates a diagram of a process of the feature extractor, in accordance with one or more embodiments.

FIG. 2 illustrates a diagram of a process of the feature extractor, in accordance with one or more embodiments. As described herein, the feature extractor 104 extracts features of input 102 (including video 102A and text 102B) and creates multimodality embeddings (e.g., video embedding 214A and text embedding 214B) input into the transformer module 118 of FIG. 1. In some embodiments, if a user query 102D is provided to the multimodal video summarization system 100, the feature extractor 104 also extracts features of the user query 102D and creates user query embedding 214C. As shown, at numeral 1, one or more feature extractor model(s) 204 extract video embeddings 214A from the video 102A and text embeddings 214B from text 102B. In some embodiments, one or more feature extractor model(s) 204 extract feature embeddings 214C from the user query 102D.

The one or more feature extractor model(s) 204 can be any one or more machine learning models including a neural network, to extract features of the multimodal input and create an embedding. A neural network may include a machine-learning model that can be tuned (e.g., trained) based on training input to approximate unknown functions. In particular, a neural network can include a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning that utilizes a set of algorithms to attempt to model high-level abstractions in data.

In some embodiments, the feature extractor model(s) 204 include RoBERTa to create text embeddings 214B (and user query features 214C) from text features and GoogleNet to create video embeddings 214A from video features. In other embodiments, the feature extractor model 204 includes one or more multimodal machine learning models to extract features from input 102. For example, the feature extractor model 204 includes a CLIP model to determine both frame-level visual embeddings 214A of video 102A of input 102 and sentence-level embeddings 214B of text 102B of input 102.

In some embodiments, the feature extractor model 204 projects the embeddings 214A and 214B into a common C-dimensional embedding space (e.g., using a fully connected layer). For N video frames of video 102A and M sentences of text 102B, the video embeddings and text embeddings can be represented mathematically using $F \in \mathbb{R}^{I\,N \times C}$ and $S \in \mathbb{R}^{I\,M \times C}$ respectively. The feature extractor model 204 may similarly project query embedding 214C into the common C-dimensional embedding space.

At numeral 2, a positional encoder 206 determines positional information to supplement to the text embedding 214B and frame embedding 214A. Positional information can be determined according to any suitable mechanism such as using sine/cosine waves to encode a position of each word (for text 102B) and frame (for video 102A) in a positional vector. Position information allows downstream processes to retain the order of words in a sentence and/or the order of frames in the video. In some embodiments, the positional information is a position matrix such as position matrix 216A and 216B.

At numeral 3, a segment generator 208 aligns the video embeddings 214A associated with video 102A and sentence-level embeddings 214B associated with text 102B in the temporal domain. The segment generator 208 aligns video and text temporally such that a segment embedding includes aligned video frames and corresponding sentences. As shown, the position information (e.g., position matrix 216A and 216B) is appended to the video embeddings 214A and text embedding 214B respectively. The text embeddings/position information and video embeddings/position embedding are concatenated along the time axis to create a segment embedding input into the transformer 118. Mathematically, this may be represented as $X \in \mathbb{R}^{I\,(M+N) \times C}$.

As described herein, each sentence (or other granularity of transcribed text) has timestamp information including a start time $t_s$ and an end time $t_e$. Further, each sentence usually lasts for a duration of several video frames such that M sentences ≤N video frames. As shown, a text embedding of a transcript of text with a duration of two seconds is aligned with two embeddings associated with one-second video frames. While one text embedding is shown to be aligned with two video embeddings, it should be appreciated that one or more text embeddings can be aligned with one or more video embeddings. The granularity of the segments including the one or more text embeddings and one or more video embeddings can control the tolerance of misalignment between the video domain and the text domain.

As shown by the black highlight behind the position matrix 216A appended to the video embedding 214A and the position matrix 216B appended to the text embedding 214B, if the user query embeddings 214C have been determined, such embeddings are concatenated to both the text embeddings/position information and video embeddings/position embedding. For U number of sentences of the user query, the input to the transformer X becomes $X \in \mathbb{R}^{I\,(M+N+U) \times C}$. As a result, when the user query 102D is input to the multimodal video summarization system 100, the user query is concatenated with the video and text embeddings.

Figure 3:
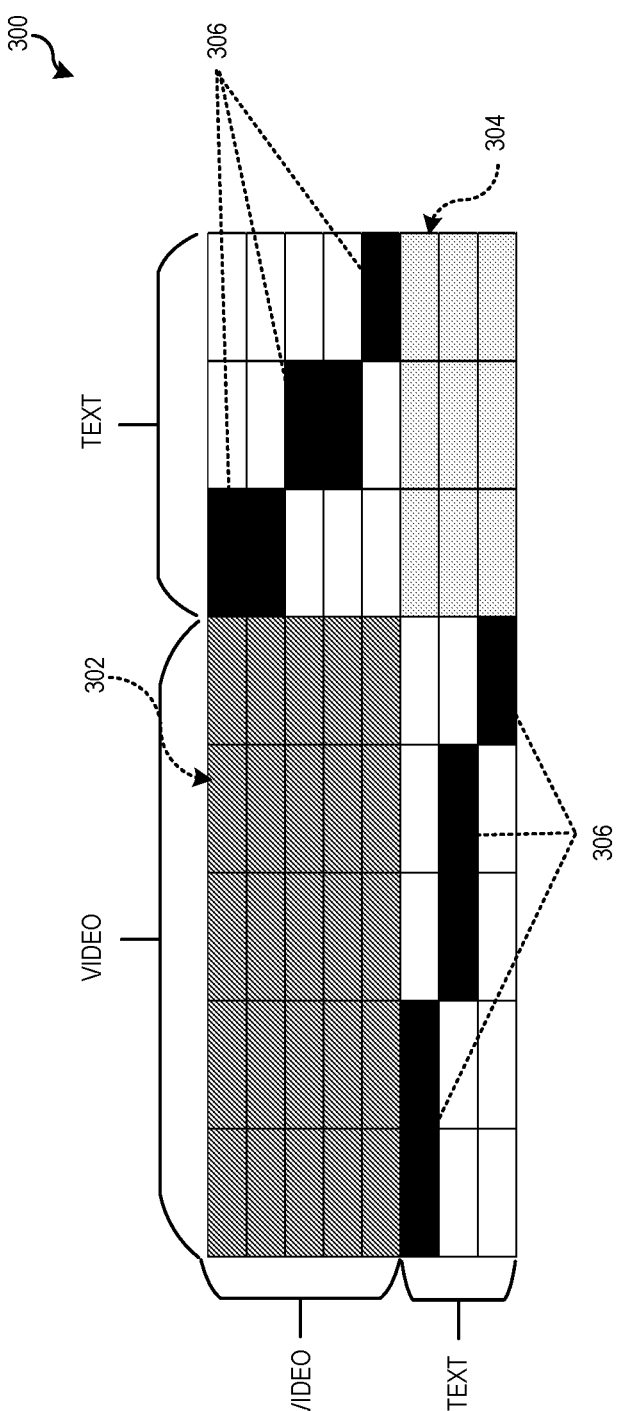
FIG. 3 is an example of the attention mask determined by the alignment guided self-attention module, in accordance with one or more embodiments.

FIG. 3 is an example of the attention mask determined by the alignment guided self-attention module 106, in accordance with one or more embodiments. The attention mask is used to fuse the video embeddings, text embeddings, and in some embodiments, the user query embeddings concatenated to the video embeddings and text embeddings. In operation, the alignment guided self-attention module 106 performs masked self-attention using the segment embeddings received from the feature extractor 104. For example, an attention mask defined by N video frames and M text sentences can be expressed mathematically as $A \in \mathbb{R}^{I\,(N+M) \times (N+M)}$. In some embodiments, the attention mask is initialized (e.g., with all 0s). The alignment guided self-attention module 106 populates the entries in the mask based on intra-modality modeling and inter-modality modeling.

For intra-modality modeling, features from the same modality attend each other. In this manner, entries corresponding to intra-modality attention are filled with a value (e.g., 1) in the attention mask 300. As shown, entries of the mask indicated by 302 are video-video entries that have been populated according to intra-modality modeling performed by the alignment guided self-attention module 106. Similarly, entries of the mask indicated by 304 are text-text entries that have been populated according to intra-modality modeling performed by the alignment guided self-attention module 106.

For inter-modality modeling, the alignment guided self-attention module 106 fills in entries of the attention mask 300 from the same segment with a value (e.g., 1). In this manner, the aligned video embeddings and corresponding text embeddings are attended. In an example, the kth sentence $S_k$ has a start time and an end time indicated by $[t_s, t_e]$. As described herein, frames of the segment are the frames which also lie in the time window $[t_s, t_e]$. Such frames may be mathematically expressed as $\{F_i\}_{i \in [t_s, t_e]}$. The alignment guided self-attention module 106 assigns entries of the attention mask 300 to a value (e.g., 1) according to $A[N+k, t_s:t_e]=1$. The inter-modality relationships are illustrated by entries 306 in the attention mask 300.

Subsequently, the alignment guided self-attention module 106 applies the attention mask A to an attention matrix. The attention matrix may be determined according to Equation (1) below:

$$Q = XW_Q,\ K = XW_K,\ V = XW_V, \tag{1}$$

$$D_{i,j} = \frac{A_{i,j}\exp(Q_i K_j^T/\sqrt{D})}{\sum_k A_{i,k}\exp(Q_i K_j^T/\sqrt{D})}$$

$$Z = X + DVW_O$$

In Equation (1) above, i, j$\in$[1, M+N] are the entry indices of the matrix, X is the concatenated input from the video and text modality as described herein, and $W_Q$, $W_K$, $W_V$ and $W_O$ are the linear projection matrices for generating the query, key, value, and output as described in conventional self-attention approaches.

Figure 4:
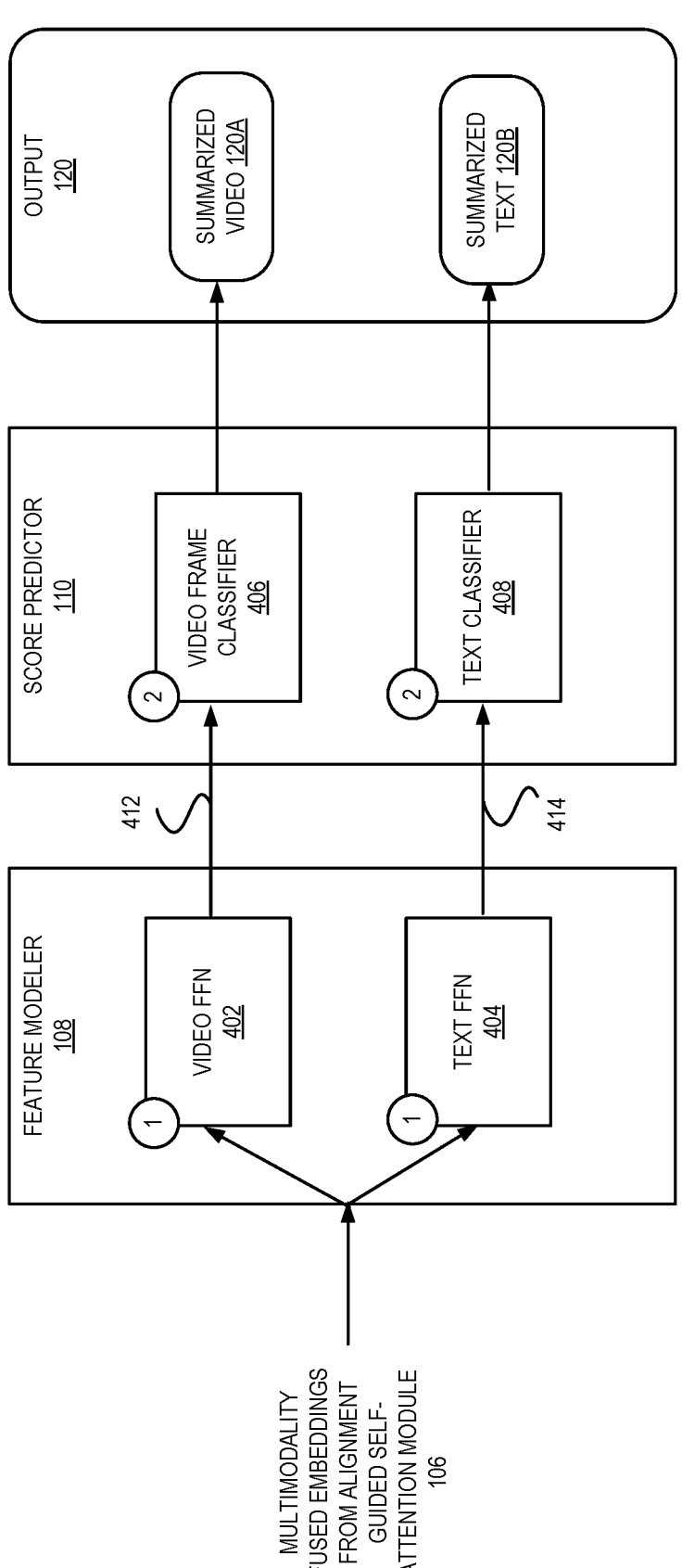
FIG. 4 illustrates a process of the feature modeler and score predictor, in accordance with one or more embodiments.

FIG. 4 illustrates a process of the feature modeler and score predictor, in accordance with one or more embodiments. The feature modeler 108 is a mixture-of-modality expert transformer based on the execution of multiple single modality branches. At numeral 1, the multimodality fused embeddings received from the alignment guided self-attention module 106 are fed to heads of the feature modeler 108 dedicated to a single modality. As shown, a first branch is a video feed-forward neural network ("Video FFN") 402, and a second branch is a text feed-forward neural network ("Text FFN") 404. By providing the multimodality fused embeddings to both the video FFN 402 and the text FFN 404, the video FFN 402 can capture non-linear relationships of video features based on the symmetric distribution of modality information. Similarly, the text FFN 404 captures non-linear relationships of text features. The execution of the video expert (e.g., video FFN 402) and the text expert (e.g., text FFN 404) distinguishes the feature modeler 108 from conventional attention transforms that share a single feed-forward neural network that receive an attention matrix to learn non-linear relationships of the features in the attention matrix. The output of the video FFN 402 is a vector of real numbers representing video features 412, and the output of the text FFN 404 is a vector of real numbers representing text features 414.

At numeral 2, the vector of real numbers representing video features 412 is fed to a head of the score predictor 110 configured to classify a relevance of video frames (e.g., the video frame classifier 406). The video frame classifier 406 determines a relevance score associated with each frame of a video. In some embodiments, the video frame classifier 406 determines a segment-level score of frames by summing the score of each of the frames in a given segment. The video frame selector 406 identifies the k-most relevant frames associated with the video input based on identifying the top k-segments with the highest relevance score. As a result, the video frame selector 406 identifies the subset of most relevant frames to the video input as summarized video 120A of output 120.

Also at numeral 2, the vector of real numbers representing text features 414 is fed to a head of the score predictor 110 configured to classify a relevance of text (e.g., the text selector 408). Each text (e.g., each sentence) is assigned a relevance score using the text classifier 408 based on the vector of real numbers 414. The text classifier 408 identifies the k-most relevant sentences associated with the text based on identifying the k-highest relevance scores of text. As a result, the text classifier 408 identifies the text that are most relevant to the text input as summarized text 120B of output 120.

Figure 5:
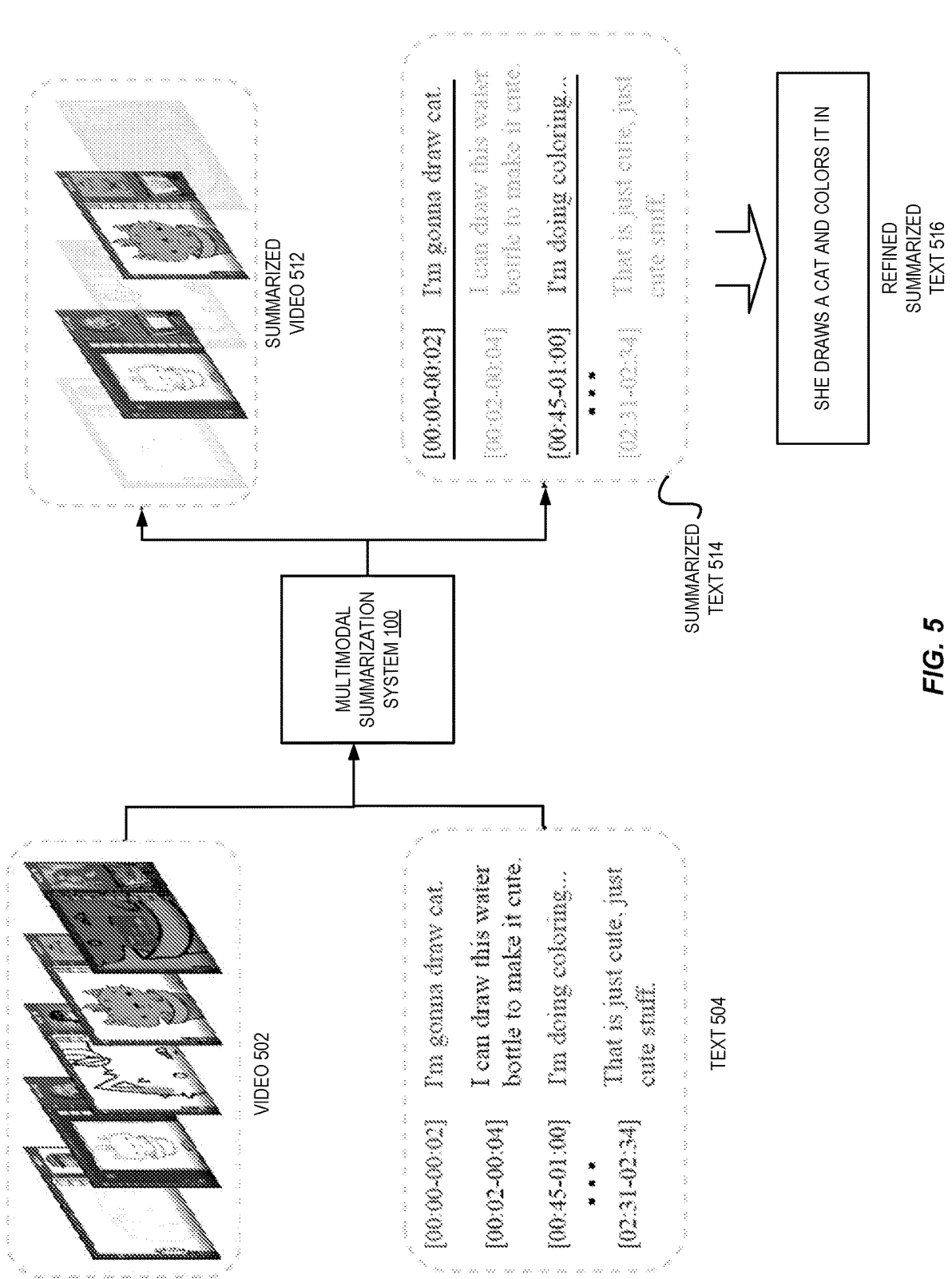
FIG. 5 illustrates an example implementation of the multimodal video summarization system, in accordance with one or more embodiments.

FIG. 5 illustrates an example implementation of the multimodal summarization system 100, in accordance with one or more embodiments. As shown, a video 502 including multiple frames is fed to the multimodal summarization system 100. Additionally, text 504 transcribing the video 502 is fed to the multimodal summarization system 100. The text 504 has been parsed into sentences, where each sentence includes a start time and an end time. The output of the multimodal summarization system 100 is a subset of frames summarizing the video 512. Additionally, summarized text 514 is output from the multimodal summarization system 100. The summarized text 514 includes a subset of sentences from the transcribed text 504. In some embodiments, each of the sentences of the summarized text 514 are concatenated.

In other embodiments, the summarized text 514 is converted to refined summarized text 516 using the multimodal summarization system 100. The refined summarized text 516 includes the summarized text 514 with improved grammar, sentence structure, and the like.

Figure 6:
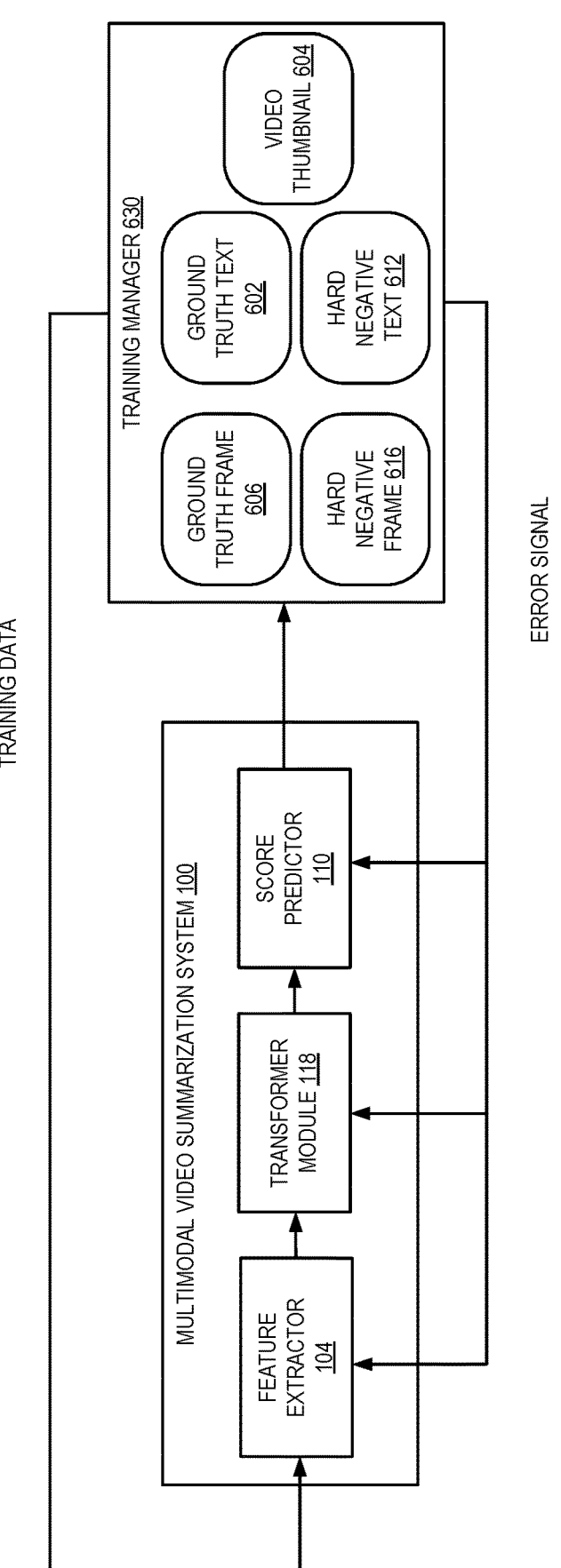
FIG. 6 illustrates training the multimodal video summarization system, according to one or more embodiments.

FIG. 6 illustrates training the multimodal summarization system, according to one or more embodiments. A training manager 630 trains the multimodal video summarization system 100 in an end-to-end approach, meaning loss is propagated back through each module (e.g., feature extractor 104, transformer module 118, and score predictor 110) of the multimodal video summarization system 100. The training manager 630 trains the multimodal video summarization system 100 using a classification loss and dual contrastive losses. In particular, the loss propagated by the training manager 630 is a combination of the classification loss, the intra-contrastive loss, and the inter-contrastive loss. Mathematically, the loss is represented according to Equation (2) below:

$$L = L_{cls} + \beta L_{inter} + \lambda L_{intra} \qquad (2)$$

In Equation (2) above, $\beta$ and $\lambda$ are hyper-parameters controlling the tradeoff between the dual contrastive losses. The classification loss $L_{cls}$ can be determined using supervised learning, in which training data (e.g., a training video input and a training text transcription associated with the training video input) is fed into the multimodal video summarization system 100 and ground truth data (e.g., ground truth text 602 and ground truth frames 606) is compared to the output of the multimodal video summarization system 100.

The training manager 630 trains the multimodal video summarization system 100 using supervised learning to determine the classification loss. In some embodiments, to determine ground truth text 602 (e.g., key sentences (and/or key words) of text associated with a video) used for such learning, users watch training videos and select keywords from sentences of the transcript. The manually determined keywords/key sentences are the ground truth text 602. In some embodiments, the training manager 630 supplements the manually determined data to generate additional ground truth text 602. For example, the training manager 630 identifies text in a text transcript that matches text identified in a title of the training video, a written summary of the training video, or other metadata associated with the transcribed text and/or training video, and the like. For example, the training manager 630 can perform n-gram analysis or other text similarity analysis to supplement the ground truth text 602.

In some embodiments, to determine ground truth frames 606 (e.g., key frames associated with frames of a video) used for supervised learning, the training manager 630 obtains a video thumbnail 604 associated with the training video. The video thumbnail 604 is an indication of one or more frames that have been identified as being relevant to the training video. The training manager 630 can obtain ground truth video frames 606 by identifying one or more video frames that are most similar to frames of the video thumbnail 604 associated with the video. To identify the one or more video frames that are most similar to the one or more video thumbnail 604 frames, the training manager 630 extracts the features of the video thumbnail 604 frames using any feature extractor (such as feature extractor 104 described herein or other encoder). Similarly, the training manager 630 extracts the features of each of the frames of the video using any feature extractor (such as feature extractor 104 described herein or other encoder). The training manager 630 determines the frames in the thumbnail that are similar to the frames in the video by performing cosine similarity (or performing a different similarity analysis) to measure the image similarity between the features of the frames in the video thumbnail 604 and the features of the frames in the video. The video frames that are determined to be most similar to the video thumbnail 604 frames are referred to herein as "ground truth" frames 606.

One property of the ground truth text 602 and ground truth frames 606, is that the ground truth text 602 is correlated with the ground truth frame 606, meaning that the ground truth text 602 and ground truth frames 606 share a similar high-level semantic meaning.

The training manager 630 passes the training videos and training text transcription associated with the ground truth frame 606 and ground truth text 602 to the multimodal video summarization system 100. The systems and processes of the multimodal video summarization system 100 are performed and subsequently the video classifier 406 and the text classifier 408 of the score predictor 110 classify a subset of the input video and a subset of the input text as relevant frames and relevant text respectively. The output of the score predictor 110 is then compared to the ground truth frame 606 and ground truth text 602. In some embodiments, a vector of relevance scores representing the relevance of each frame determined from the score predictor 110 is compared to a sparse vector indicating the ground truth frame 606 to determine a video classification loss. Additionally, a vector of relevance scores representing the relevance of each sentence determined from the score predictor 110 is compared to a sparse vector indicating the ground truth text 602 to determine a text classification loss. The training manager 630 trains the multimodal video summarization system 100 using a classification loss that is a sum of both the video classification loss and the text classification loss. Mathematically, the classification loss is defined according to Equation (3) below:

$$L_{cls} = L_{cls_{video}} + L_{cls_{text}} \tag{3}$$

It should be appreciated that the classification loss can include any loss function including the square error function, the room mean square error function, and/or the cross entropy error function. In some embodiments, the classification loss is the focal loss function because the focal loss handles class imbalance. In the present disclosure, the classes (e.g., key frame class, key text class, non-key frame class, and non-key text class) are imbalanced because most of the video frames of livestream videos are irrelevant (e.g., non-key frames) and most of the text transcribed from a livestream video is irrelevant (e.g., non-key text). As such, the class of irrelevant training data (e.g., non-key frames and non-key text) is greater than the class of relevant (e.g., key frames and key text) training data. The focal loss handles such class imbalanced training samples by weighing down losses for well-classified samples (e.g., the irrelevant training data). Mathematically, the classification loss can be defined according to Equation (4) below:

$$L_{cls_m} = -\frac{1}{N} \sum_{i=1}^{N} \begin{cases} -\alpha(1-p_i)^\gamma \log(p_i), & \text{if } y_i = 1 \\ -(1-\alpha)p_i^\gamma \log(1-p_i), & \text{if } y_i = 0 \end{cases} \tag{4}$$

Equation (4) above represents a single modality classification loss, where m can be either video or text. Additionally, $p_i$ represents the predicted score for each frame/sentence and $y_i$ represents the ground truth label. In Equation (4) above, if $y_i=1$, the ith frame/sentence has been identified as being a key frame/key sentence and if $y_i=0$, the ith frame/sentence has been identified as being irrelevant (e.g., not a key frame/key sentence).

The dual contrastive losses $L_{inter}+L_{intra}$ described in Equation (2) above are determined using contrastive learning, in which pairs (or triplets) of data are fed to the multimodal video summarization system 100. Contrastive learning is a mechanism of learning that utilizes supervised learning to minimize a distance (such as Euclidean distance) between similar samples in an embedding space and maximize a distance between dissimilar samples in the embedding space. In operation, a sample (e.g., a text or a video frame) is compared to a similar sample (e.g., a ground truth text 602 or a ground truth frame 606 respectively) and a dissimilar sample (e.g., a hard negative text 612 or a hard negative frame 618 respectively).

Using the ground truth frame 606, the training manager 630 can determine dissimilar samples used during contrastive learning. In one embodiment, the dissimilar samples are any frames of a video sequence that are not ground truth frames 606. In some embodiments, the training manager 630 feeds the training video including the ground truth frame 606 into the multimodal video summarization system 100 and identifies negative samples as frames that receive a relevance score (determined by the score predictor 110) that satisfy a threshold. For example, the training manager 630 may select negative frames as frames that receive low relevance scores from the score predictor 110. In some embodiments, the training manager 630 can supplement the ground truth frames 606 with frames that receive a high relevance score from the score predictor 110.

In one embodiment, the training manager 630 feeds the training video including the ground truth frame 606 into the multimodal video summarization system 100 and identifies "hard negative" samples as frames that received a relevance score (determined by the score predictor 110) that satisfies a threshold. For example, the training manager 630 may select hard negative frames 616 as the frames that received high relevance scores from the score predictor 110. While a high score indicates that the frame may be a key frame (e.g., a frame of the summarized video 120A), the training manager 630 knows that the frame that received the high score is not a key frame because the frame is not a ground truth frame 606. Accordingly, the training manager 630 determines that the frame that received the high score is a hard negative frame 616. In some embodiments, the hard negative frames 616 are the frames with the top-k highest scores of N video frames. The hard negative frames can be represented mathematically as $$K_{video} = \frac{N}{r}$$

where r is a hyper-parameter controlling the total number of selected hard negative samples. In some embodiments, the training manager 630 removes any one or more frames adjacent to the ground truth frames 606 from being treated as a hard negative frame (or a dissimilar sample generally) as frames adjacent to ground truth frames 606 likely share similar characteristics as the ground truth frames 606.

Accordingly, determining that frames adjacent to the ground truth frames 606 are hard negative frames 616 may confuse the multimodal video summarization system 100. In some embodiments, one or more frames adjacent to the ground truth frames 606 are treated as additional ground truth frames 606.

Similarly, the training manager 630 can determine dissimilar samples used during contrastive learning using the ground truth text 602. In one embodiment, the dissimilar samples are any text (e.g., sentences) that are not the ground truth text 602. In some embodiments, the training manager 630 feeds the text including the ground truth text 602 into the multimodal video summarization system 100 and identifies negative samples as text that receive a relevance score (determined by the score predictor 110) that satisfy a threshold. For example, the training manager 630 may select negative text as text that receives low relevance scores from the score predictor 110. In some embodiments, the training manager 630 can supplement the ground truth text 602 with frames that receive a high relevance score from the score predictor 110.

In one embodiment, the training manager 630 feeds the text including the ground truth text 602 into the multimodal video summarization system 100 and identifies "hard negative" samples as text that received a relevance score (determined by the score predictor 110) that satisfies a threshold. For example, the training manager 630 may select hard negative text 612 as text that received a high relevance score from the score predictor 110. In some embodiments, the hard negative text 612 is the text with the top-k highest scores of M text sentences. The hard negative text can be represented mathematically as $$K_{text} = \frac{M}{r}$$

where r is a hyper-parameter controlling the total number of selected hard negative samples. In some embodiments, the training manager 630 removes one or more text (e.g., sentences) adjacent to ground truth text 602 (e.g., a sentence immediately before or after the ground truth text 602) from being treated as a hard negative text 612. In some embodiments, one or more text adjacent to the ground truth text 602 is treated as additional ground truth text 602.

A first contrastive loss used to train the multimodal video summarization system 100 is an inter-sample contrastive loss, $L_{inter}$. The inter-sample contrastive loss is the loss learned from different modality sample pairs from different videos. The inter-sample contrastive loss is described in more detail with reference to FIG. 7. Using the inter-sample contrastive loss, the multimodal video summarization system 100 learns relationships of videos and the corresponding text at the video-level by comparing video-text pairs of different videos.

The second contrastive loss is an intra-sample contrastive loss, $L_{intra}$. The intra-sample contrastive loss is the loss learned from different modality sample pairs from different segments of the same video. For example, text and frames of different segments are compared. The intra-sample contrastive loss is described in more detail with reference to FIG. 8. Using the intra-sample contrastive loss, the multimodal video summarization system 100 learns relationships at the segment-level (e.g., a more fine-grained granularity than the video-level learned using inter-sample contrastive learning discussed above).

FIG. 7 illustrates the positive and negative pairs used to train the multimodal video summarization system 100 for inter-sample contrastive loss, according to some embodiments. As described herein, inter-sample contrastive loss is the loss obtained when learning from video/text pairs of different videos. As described herein, a feature embedding of a sequence of video frames of a video is appended with a CLSV token, and a text embedding of a set of text transcribing the video is appended with a CLST token. Accordingly, CLSV1 represents the video embeddings of a first video, CLSV2 represents the video embeddings of a second video, and CLSVB represents the video embeddings of a Bth video. Similarly, CLST1 represents the text embeddings of a first text associated with the first video, CLST2 represents the text embeddings of a second text associated with the second video, and CLSTB represents the text embeddings of a Bth text associated with the Bth video. The positive pairs used by the training manager 630 to train the alignment-guided self-attention module 106 using inter-sample contrastive loss are the pairs of aligned video and text. Indicated using grey in example 700, the video feature embeddings of video 1 can be considered a positive pair when matched with the text feature embeddings of video 1. In contrast, indicated using white in example 700, the video feature embeddings of video 2 can be considered a negative pair when matched with the text feature embeddings of video 1. As described herein, the training manager 630 maximizes the cosine similarity of the video embeddings [CLSV] and the text embeddings [CLST] for B real pairs in a batch B of B different videos/text, while the training manager 630 minimizes the cosine similarity for embeddings for $B^2-B$ incorrect pairs (e.g., the video feature embeddings of video 1 and the text feature embeddings of text 2). In this manner, the multimodal video summarization system 100 learns the relationship between text and video of the same video. Mathematically, this can be represented in Equation (5) below:

$$L_{inter} = \mathbb{E}_{z \sim [CLSV]_{j,z}+\sim[CLST]_{j,z}-\sim I_{k \neq j}[CLST]_k} \ell(z, z^+, z^-) + \qquad (5)$$

$$\mathbb{E}_{z \sim [CLST]_{j,z}+\sim[CLSV]_{j,z}-\sim I_{k \neq j}[CLSV]_k} \ell(z, z^+, z^-)$$

where $$\ell(z, z^+, z^-) = -\log\left(\frac{\exp\left(z^T \cdot \frac{z^+}{\tau}\right)}{\exp\left(z^T \cdot \frac{z^+}{\tau}\right) + \sum_k \exp\left(z^T \cdot \frac{z}{\tau}\right)}\right)$$

In Equation (5) above, $\ell(z,z^+,z^-)$ is a contrastive loss that minimizes the negative log probability of matching a sample (e.g., z) with the corresponding positive sample (e.g., $z^+$). Alternate loss functions can include contrastive loss, triplet loss, lifted structure loss, N-pair loss, angular loss, divergence loss, InfoNCE, momentum contrast, and the like.

Figure 8:
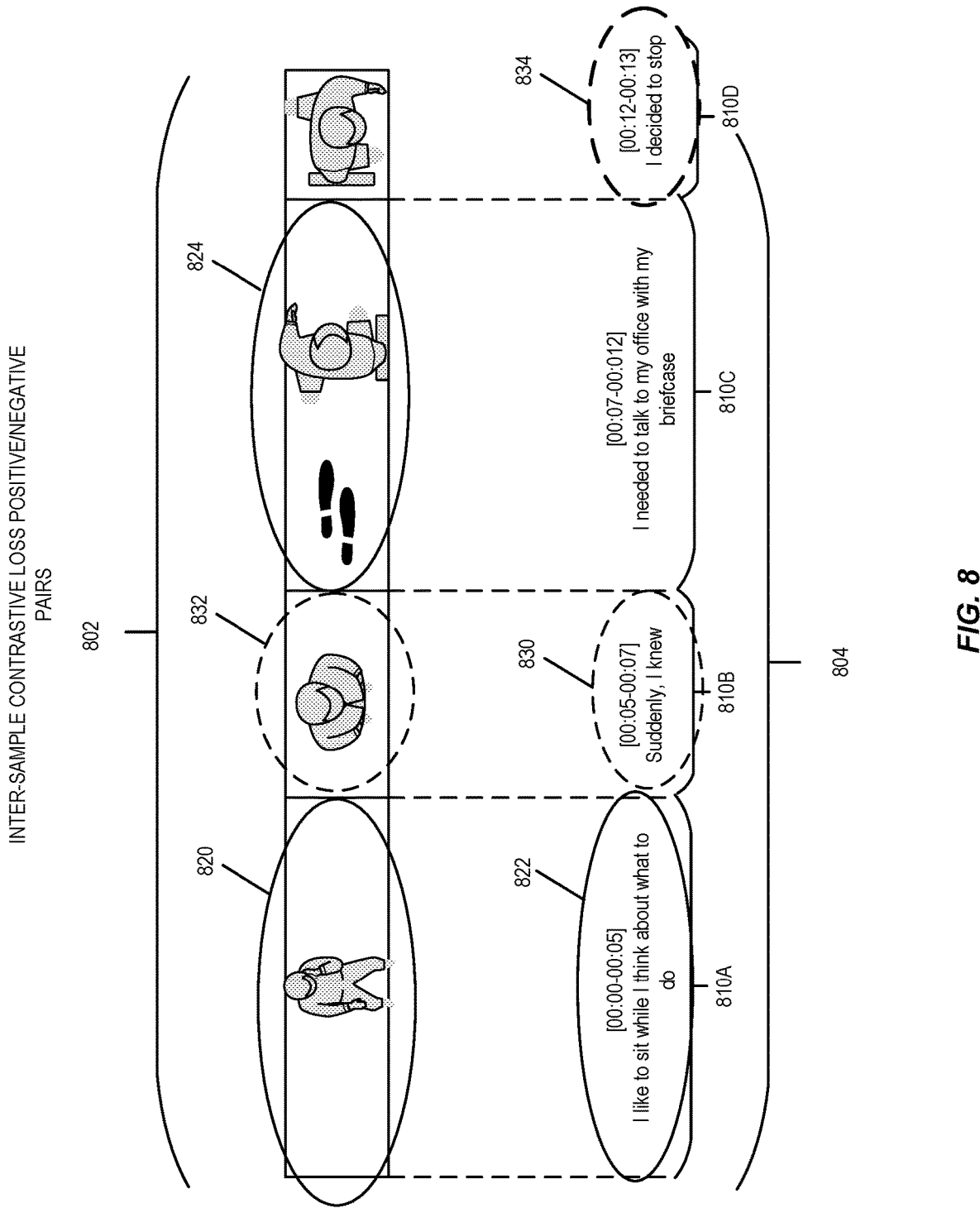
FIG. 8 illustrates the positive and negative pairs used to train the multimodal video summarization system for intra-sample contrastive loss, according to some embodiments.

FIG. 8 illustrates the positive and negative pairs used to train the multimodal video summarization system 100 for intra-sample contrastive loss, according to some embodiments. As described herein, intra-sample contrastive loss is the loss obtained when learning from video/text pairs of different segments in the same video. As shown, video frames 802 and text 804 are aligned in segments 810A-810D, where each segment includes multiple video frames and one text sentence. For a video frame of the video frames 820 associated with the first segment 810A, the corresponding positive sentence is text 822 and a corresponding hard negative frame is a video frame of a different segment (such as a video frame of the video frames 824 in segment 810C). For the sentence 830 associated with the second segment 810B, the corresponding positive frame is a video frame of the video frames 832 and a corresponding hard negative sentence is sentence 834 of segment 810D. In this manner, the multimodal video summarization system 100 learns a fine-grained relationship between text and video of different segments of the same video. Mathematically, this can be represented in Equation (6) below:

$$L_{intra} = \qquad (6)$$

$$\mathbb{E}_{z \sim I_{PF}, z^+ \sim I_{PS}, z^- \sim I_{HNF}} \ell(z, z^+, z^-) + \mathbb{E}_{z \sim I_{PS}, z^+ \sim I_{PF}, z^- \sim I_{HNS}} \ell(z, z^+, z^-)$$

where $$\ell(z, z^+, z^-) = -\log \left( \frac{\exp\left(z^T \cdot \frac{z^+}{\tau}\right)}{\exp\left(z^T \cdot \frac{z^+}{\tau}\right) + \sum_k \exp\left(z^T \cdot \frac{z^-}{\tau}\right)} \right)$$

In Equation (6) above, $\ell(z, z^+, z^-)$ is the same as in Equation (5). In Equation (6), $I_{PF}$ represents a positive frame, $I_{HNF}$ represents a hard negative frame, $I_{PS}$ represents a positive sentence, and $I_{HNS}$ represents a hard negative sentence. In operation, the intra-sample contrastive loss mines positive and hard-negative embeddings (or other dissimilar samples) from the paired video frames and text sentences of the same segment. For each pair of samples, the cosine similarity of positive frame embeddings and positive sentence embeddings is maximized, while the similarity between positive embeddings and hard-negative embeddings is minimized. As described herein, the positive embeddings are the ground truth key frames and the ground truth key sentences. The hard-negative embeddings are the false-positive embeddings with the highest predicted relevance scores.

Figure 9:
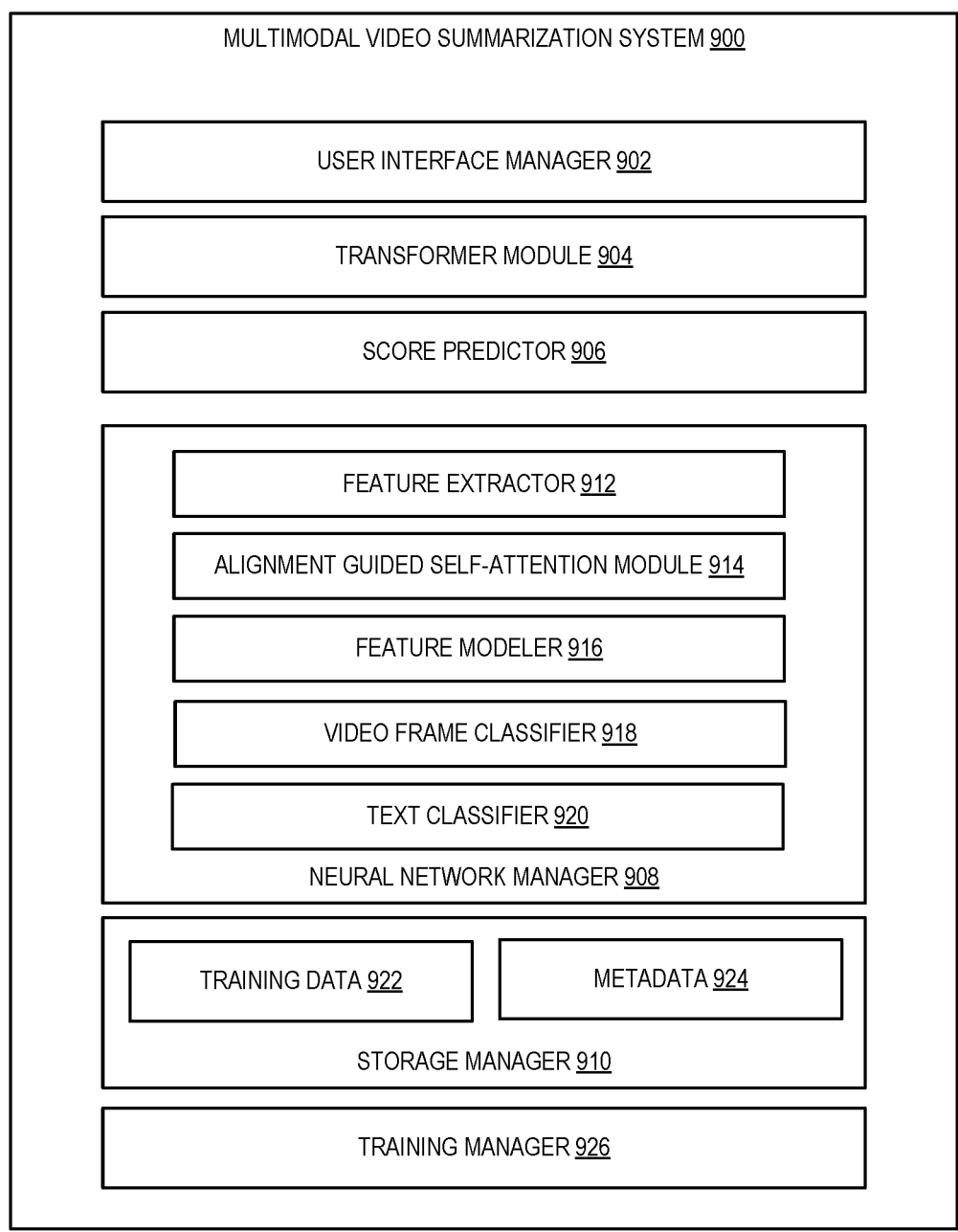
FIG. 9 illustrates a schematic diagram of multimodal video summarization system in accordance with one or more embodiments.

FIG. 9 illustrates a schematic diagram of multimodal video summarization system (e.g., "multimodal video summarization system" described above) in accordance with one or more embodiments. As shown, the multimodal video summarization system 900 may include, but is not limited to, a user interface manager 902, a transformer module 904, a score predictor 906, a neural network manager 908, and a storage manager 910. The neural network manager 908 includes a feature extractor 912, an alignment guided self-attention module 914, and a feature modeler 916. The storage manager 910 includes video frame classifier 918, text classifier 920, and training data 922.

As illustrated in FIG. 9, the multimodal video summarization system 900 includes a user interface manager 902. The user interface manager 902 allows users to provide input video data to the multimodal video summarization system 900. In some embodiments, users also provide text data to the multimodal video summarization system 900. In other embodiments, when the user provides video data to the multimodal video summarization system 900, one or more upstream processes transcribes the video to provide text data associated with the video data. In some embodiments, the user interface manager 902 provides a user interface through which the user can upload the video data which represents the video to be summarized, as discussed above. In some embodiments, the user also provides a user query to the user interface manager 902, such that the video/text are summarized with respect to the received user query (e.g., a user query asking whether a concept is described in the video, a user query asking at what timestamp is the concept described in the video, etc.) Alternatively, or additionally, the user interface may enable the user to download a video (and a corresponding transcribed text) from a local or remote storage location (e.g., by providing an address (e.g., a URL or other endpoint) associated with a video). In some embodiments, the user interface can enable a user to link a video capture device, such as a camera or other hardware to capture livestream data and provide it to the multimodal video summarization system.

As illustrated in FIG. 9, the multimodal video summarization system 900 includes a transformer module 904. The transformer module 904 is a machine learning architecture that is used when solving sequence tasks. Specifically, the transformer module 904 performs attention using the alignment guided self-attention module 914 hosted by the neural network manager 908. The transformer module 904 also outputs a vector representation weighing each element in a sequence using a feature modeler 916 hosted by the neural network manager 908.

As illustrated in FIG. 9, the multimodal video summarization system 900 includes a score predictor 906. The score predictor 906 classifies a relevance of each frame/text using a relevance score of the frames/text. Specifically, the score predictor 906 employs a unique head to score a unique modality.

As illustrated in FIG. 9, the multimodal video summarization system 900 includes a neural network manager 908. Neural network manager 908 may host a plurality of neural networks or other machine learning models, such as feature extractor 912, alignment guided self-attention module 914, feature modeler 916, video frame classifier 918, and text classifier 920. The neural network manager 908 may include an execution environment, libraries, and/or any other data needed to execute the machine learning models. In some embodiments, the neural network manager 908 may be associated with dedicated software and/or hardware resources to execute the machine learning models. Although depicted in FIG. 9 as being hosted by a single neural network manager 908, in various embodiments the feature extractor 912, alignment guided self-attention module 914, feature modeler 916, video frame classifier 918, and text classifier 920 may be hosted in multiple neural network managers and/or as part of different components. For example, each machine learning model can be hosted by their own neural network manager, or other host environment, in which the respective neural networks execute, or the machine learning models may be spread across multiple neural network managers depending on, e.g., the resource requirements of each machine learning model.

The feature extractor 912 hosted by the neural network manager 908 determines feature embedding of one or more frames in the video domain and one or more sentences in the text domain. For example the feature extractor 912 can include RoBERTa to create text embeddings (and user query embeddings) and GoogleNet to create video embeddings. In some embodiments, the feature extractor 912 includes a CLIP model to determine both frame-level visual embeddings of video and sentence-level embeddings of text. The feature extractor 912 is also able to determine positional information to supplement the text embeddings and frame embeddings. Positional information can be determined according to any suitable mechanism such as using sine/cosine waves to encode a position of each word (for text) and frame (for video) in a positional vector. The feature extractor 912 is also able to align the video embeddings and text embeddings in the temporal domain in a segment. The position information is appended to the video embeddings 214A and text embedding 214B respectively. The text embeddings/position information and video embeddings/position information are concatenated along the time axis to create a segment embedding input into the transformer module 904.

The alignment guided self-attention module 914 hosted by the neural network manager 908 performs cross-attention of segments to fuse multiple modalities (e.g., video embeddings, text embeddings, and user query embeddings). Specifically, the alignment guided self-attention module 914 determines an attention mask using intra-modality relationships and inter-modality relationships of text/video embeddings. The attention mask is used to fuse the video embeddings, text embeddings, and in some embodiments, the user query embeddings concatenated to the video embeddings and text embeddings. For intra-modality modeling, features from the same modality attend each other. In this manner, entries corresponding to intra-modality attention are filled with a value (e.g., 1) in the attention mask. For inter-modality modeling, the alignment guided self-attention module 914 fills in entries of the attention mask from the same segment with a value (e.g., 1). In this manner, the aligned video embeddings and corresponding text embeddings are attended. Subsequently, the alignment guided self-attention module 914 applies the attention mask A to an attention matrix.

The feature modeler 916 hosted by the neural network manager 908 employs multiple expert branches to capture single modality information from multimodality fused embeddings. The feature modeler 916 is a mixture-of-modality expert transformer based on the execution of multiple single modality branches. The multimodality fused embeddings received from the alignment guided self-attention module are fed to heads of the feature modeler 916 dedicated to a single modality. A first branch of the feature modeler 916 is a video feed-forward neural network ("Video FFN") and a second branch is a text feed-forward neural network ("Text FFN"). By providing the multimodality fused embeddings to both the video FFN and the text FFN, the symmetric distribution of modality information allows the video FFN to learn non-linear relationships of video features. Similarly, the text FFN learns non-linear relationships of text features.

The video frame classifier 918 hosted by the neural network manager 908 determines a relevance score associated with each frame of a video using a vector of real numbers received from the feature modeler 916. In some embodiments, the video frame classifier 918 determines a segment-level score of frames by summing the score of each of the frames in a given segment. The video frame selector 918 identifies the k-most relevant frames associated with the video input based on identifying the top k-segments with the highest relevance score. As a result, the video frame selector 918 identifies the subset of most relevant frames to the video input as summarized video.

The text classifier 920 hosted by the neural network manager 908 determines a relevance score associated with each text of the text transcript using a vector of real numbers received from the feature modeler 916. Each text (e.g., each sentence) is assigned a relevance score using the text classifier 920 based on the vector of real numbers. The text classifier 920 identifies the k-most relevant sentences associated with the text based on identifying the k-highest relevance scores of text. As a result, the text classifier 920 identifies the text that are most relevant to the text input as summarized text.

As illustrated in FIG. 9, the multimodal video summarization system 900 includes a storage manager 910. The storage manager 910 maintains data for the multimodal video summarization system 900. The storage manager 910 can maintain data of any type, size, or kind as necessary to perform the functions of the multimodal video summarization system 900. The storage manager 910, as shown in FIG. 9, includes the training data 922. Training data 922 includes videos and transcribed text that is used by the training manager 926 to train the multimodal video summarization system. The training data can include the manually determined ground truths (e.g., thumbnail frames, ground truth text) and additional training data supplementing the ground truth (e.g., ground truth frames, hard negative frames, hard negative text). The storage manager 910 can also store metadata 924 associated with videos/text such as an author/creator of the video, a title of the video, a software (and software version) used to transcribe text associated with the video, views associated with the video, and the like.

As illustrated in FIG. 9, the multimodal video summarization system 900 also includes a training manager 926. The training manager 926 can teach, guide, tune, and/or train one or more neural networks. As described herein, the training manager 926 trains the components of the multimodal video summarization system using end-to-end back propagation. Specifically, the training manager 926 trains the multimodal summarization system using classification loss and dual contrastive losses (e.g., intra-sample contrastive loss and inter-sample contrastive loss). The training manager 926 can access, identify, generate, create, and/or determine training input and utilize the training input to train and fine-tune a machine learning model.

Each of the components of the multimodal video summarization system 900 and their corresponding elements (as shown in FIG. 9) may be in communication with one another using any suitable communication technologies. It will be recognized that although components and their corresponding elements are shown to be separate in FIG. 9, any of components and their corresponding elements may be combined into fewer components, such as into a single facility or module, divided into more components, or configured into different components as may serve a particular embodiment.

The components and their corresponding elements can comprise software, hardware, or both. For example, the components and their corresponding elements can comprise one or more instructions stored on a computer-readable storage medium and executable by processors of one or more computing devices. When executed by the one or more processors, the computer-executable instructions of the multimodal video summarization system 900 can cause a client device and/or a server device to perform the methods described herein. Alternatively, the components and their corresponding elements can comprise hardware, such as a special purpose processing device to perform a certain function or group of functions. Additionally, the components and their corresponding elements can comprise a combination of computer-executable instructions and hardware.

Furthermore, the components of the multimodal video summarization system 900 may, for example, be implemented as one or more stand-alone applications, as one or more modules of an application, as one or more plug-ins, as one or more library functions or functions that may be called by other applications, and/or as a cloud-computing model. Thus, the components of the multimodal video summarization system 900 may be implemented as a stand-alone application, such as a desktop or mobile application. Furthermore, the components of the multimodal video summarization system 900 may be implemented as one or more web-based applications hosted on a remote server. Alternatively, or additionally, the components of the multimodal video summarization system 900 may be implemented in a suite of mobile device applications or "apps." To illustrate, the components of the multimodal video summarization system 900 may be implemented as part of an application, or suite of applications, including but not limited to ADOBE CREATIVE CLOUD, ADOBE PHOTOSHOP, ADOBE ACROBAT, ADOBE ILLUSTRATOR, ADOBE LIGHT-ROOM and ADOBE INDESIGN. "ADOBE", "CREATIVE CLOUD," "PHOTOSHOP," "ACROBAT," "ILLUSTRA-TOR," "LIGHTROOM," and "INDESIGN" are either registered trademarks or trademarks of Adobe Inc. in the United States and/or other countries.

As shown, the multimodal video summarization system 900 can be implemented as a single system. In other embodiments, the multimodal video summarization system 900 can be implemented in whole, or in part, across multiple systems. For example, one or more functions of the multimodal video summarization system 900 can be performed by one or more servers, and one or more functions of the multimodal video summarization system 900 can be performed by one or more client devices. The one or more servers and/or one or more client devices may generate, store, receive, and transmit any type of data used by the multimodal video summarization system 900, as described herein.

In one implementation, the one or more client devices can include or implement at least a portion of the multimodal video summarization system 900. In other implementations, the one or more servers can include or implement at least a portion of the multimodal video summarization system 900. For instance, the multimodal video summarization system 900 can include an application running on the one or more servers or a portion of the multimodal video summarization system 900 can be downloaded from the one or more servers. Additionally or alternatively, the multimodal video summarization system 900 can include a web hosting application that allows the client device(s) to interact with content hosted at the one or more server(s).

For example, upon a client device accessing a webpage or other web application hosted at the one or more servers, in one or more embodiments, the one or more servers can initiate the multimodal video summarization system stored at the one or more servers. Specifically, the client device can generate a request (e.g., via a user input) to summarize a selected video. In some embodiments, the request includes a text input from the user (e.g., a user query, as described herein). Upon receiving the request, the one or more servers can automatically perform the methods and processes described herein to transcribe the video (or retrieve an already transcribed version of the video), and subsequently summarize the video by determining a subset of video frames identified as key frames, and a subset of the transcribed text identified as key text. The one or more servers can provide the key frames and key text to the client device for display to the user.

The server(s) and/or client device(s) may communicate using any communication platforms and technologies suitable for transporting data and/or communication signals, including any known communication technologies, devices, media, and protocols supportive of remote data communications, examples of which will be described in more detail below with respect to FIG. 11. In some embodiments, the server(s) and/or client device(s) communicate via one or more networks. A network may include a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. The one or more networks will be discussed in more detail below with regard to FIG. 11.

The server(s) may include one or more hardware servers (e.g., hosts), each with its own computing resources (e.g., processors, memory, disk space, networking bandwidth, etc.) which may be securely divided between multiple customers (e.g. client devices), each of which may host their own applications on the server(s). The client device(s) may include one or more personal computers, laptop computers, mobile devices, mobile phones, tablets, special purpose computers, TVs, or other computing devices, including computing devices described below with regard to FIG. 11.

FIGS. 1-9, the corresponding text, and the examples, provide a number of different systems and devices that allows a user to perform multimodal video summarization. In addition to the foregoing, embodiments can also be described in terms of flowcharts comprising acts and steps in a method for accomplishing a particular result. For example, FIG. 10 illustrates a flowchart of an exemplary method in accordance with one or more embodiments. The method described in relation to FIG. 10 may be performed with fewer or more steps/acts or the steps/acts may be performed in differing orders. Additionally, the steps/acts described herein may be repeated or performed in parallel with one another or in parallel with different instances of the same or similar steps/acts.

FIG. 10 illustrates a flowchart 1000 of a series of acts in a method of performing multimodal video summarization in accordance with one or more embodiments. In one or more embodiments, the method 1000 is performed in a digital medium environment that includes the multimodal video summarization system 900. The method 1000 is intended to be illustrative of one or more methods in accordance with the present disclosure and is not intended to limit potential embodiments. Alternative embodiments can include additional, fewer, or different steps than those articulated in FIG. 10.

As illustrated in FIG. 10, the method 1000 includes an act 1002 of receiving a video input and a text transcription of the video input, wherein the video input includes a plurality of frames and the text transcription includes a plurality of sentences. The video can include any digital visual media including a plurality of frames which, when played, includes a moving visual representation of a story and/or an event. In some embodiments, the video includes an audio component. In some embodiments, the video is a livestream video. Livestream videos have several distinctive characteristics over other types of videos. For example, the background of the livestream video is generally static, meaning the background frames of the livestream video appear visually similar and/or change slowly over time. In contrast, videos other than livestream videos may be edited videos such that the videos are of a shorter duration and include a variety in scene transitions.

The text transcript can include a description of intelligible language produced by one or more speakers in the video, the background noises in the video, and the like. The text transcript may be parsed into text at the sentence level, speaker level, phrase level (e.g., one or more sentences), turns in a conversation, according to a duration of time, and the like, and include timestamps of the transcribed video. In one embodiment, the text is a sentence level transcript of the video, where each transcribed sentence is associated with a start time and an end time. For example, a sentence spoken by a speaker can include a start time when the speaker started the sentence, and an end time when the speaker finished the sentence. The text transcript is provided as input using any speech to text processing that may be performed as an upstream process. Generally, a text transcript determined from a livestream video, as compared to other edited videos, is longer (based on the longer duration of the livestream video) and includes redundant and/or irrelevant information. It should be appreciated that the text transcript is roughly temporally aligned with video.

In some embodiments, a user query is received as an input. The user query is an additional text input but is distinguished from text that transcribes the video. An example user query may be a user prompt asking about content of the video. For example, a user query may be a prompt asking if the video includes/describes a particular concept, when a particular concept is described in the video (e.g., at what time stamp), and the like.

As illustrated in FIG. 10, the method 1000 includes an act 1004 of determining, by a multimodal summarization model, a subset of key frames of the plurality of frames and a subset of key sentences of the plurality of sentences. The multimodal summarization model identifies the subset of key frames and the subset of key sentences and the k-most relevant frames of the plurality of frames, and the k-most relevant sentences of the plurality of sentences. Specifically, single modality classifiers are implement to score a relevance of a vector representation of content in a unique modality (e.g., frames of the video domain and sentences of the text domain). The vector representation of each modality is extracted from a temporally aligned fused multimodality matrix. The entries in the matrix have been attended based on attending features from the same modality (e.g., intra-modality modeling) and attending features from the same temporally aligned segment (e.g., intra-modality modeling).

As illustrated in FIG. 10, the method 1000 includes an act 1006 of providing a summary of the video input and a summary of the text transcription based on the subset of key frames and the subset of key sentences. A summary of the video input and a summary of the text transcription may be displayed to a user via a computing device, saved in one or more files, uploaded to one or more servers, and the like. The summary of the video input and the summary of the text transcription is a multimodal summarization of the video input and text transcription. In operation, the subset of frames that are identified as relevant given the input video become the summarized video. In other words, the summarized video frames are extracted frames of the video input. Similarly, the subset of sentences that are identified as relevant given the text transcription become the summary of the text transcription. For example, given multiple sentences of a video transcription a subset of sentences that are key sentences are identified to summarize the video.

In some embodiments, key text sentences are concatenated to provide the summary of the text transcription. In other embodiments, one or more machine learning models (such as any language model) are executed to generate a refined/comprehensive text summary. For example, as opposed to concatenating sentences/phrases of text received, a language model receives the identified key sentences as a prompt and creates a refined summary of the key sentences by adding punctuation, transitional language, removing redundant words, and the like.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other non-transitory storage medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
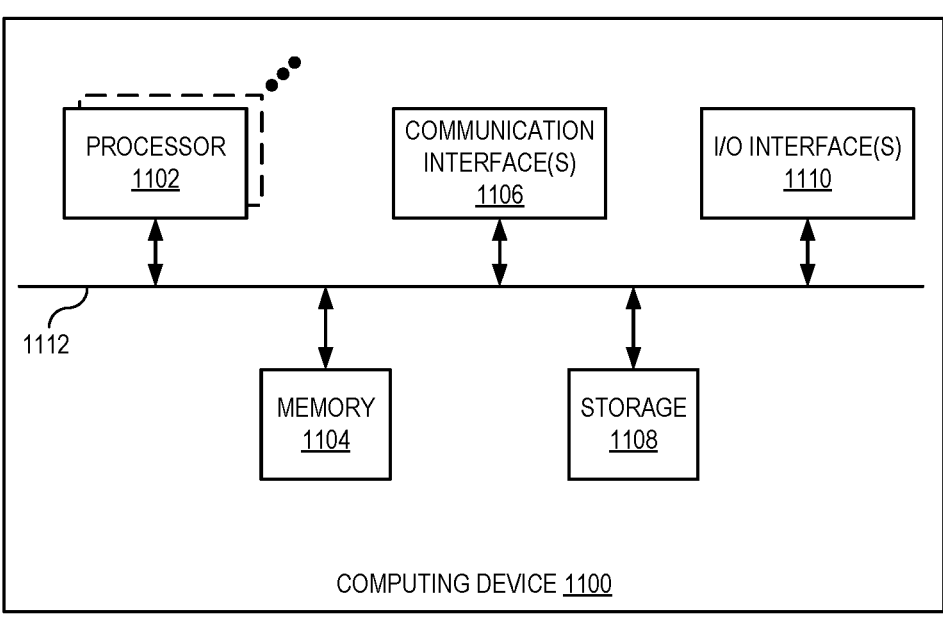
FIG. 11 illustrates a block diagram of an exemplary computing device in accordance with one or more embodiments.

FIG. 11 illustrates, in block diagram form, an exemplary computing device 1100 that may be configured to perform one or more of the processes described above. One will appreciate that one or more computing devices such as the computing device 1100 may implement the multimodal video summarization system. As shown by FIG. 11, the computing device can comprise a processor 1102, memory 1104, one or more communication interfaces 1106, a storage device 1108, and one or more I/O devices/interfaces 1110. In certain embodiments, the computing device 1100 can include fewer or more components than those shown in FIG. 11. Components of computing device 1100 shown in FIG. 11 will now be described in additional detail.

In particular embodiments, processor(s) 1102 includes hardware for executing instructions, such as those making up a computer program. As an example, and not by way of limitation, to execute instructions, processor(s) 1102 may retrieve (or fetch) the instructions from an internal register, an internal cache, memory 1104, or a storage device 1108 and decode and execute them. In various embodiments, the processor(s) 1102 may include one or more central processing units (CPUs), graphics processing units (GPUs), field programmable gate arrays (FPGAs), systems on chip (SoC), or other processor(s) or combinations of processors.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1104 may be internal or distributed memory.

The computing device 1100 can further include one or more communication interfaces 1106. A communication interface 1106 can include hardware, software, or both. The communication interface 1106 can provide one or more interfaces for communication (such as, for example, packet-based communication) between the computing device and one or more other computing devices 1100 or one or more networks. As an example and not by way of limitation, communication interface 1106 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can comprise hardware, software, or both that couples components of computing device 1100 to each other.

The computing device 1100 includes a storage device 1108 includes storage for storing data or instructions. As an example, and not by way of limitation, storage device 1108 can comprise a non-transitory storage medium described above. The storage device 1108 may include a hard disk drive (HDD), flash memory, a Universal Serial Bus (USB) drive or a combination these or other storage devices. The computing device 1100 also includes one or more input or output ("I/O") devices/interfaces 1110, which are provided to allow a user to provide input to (such as user strokes), receive output from, and otherwise transfer data to and from the computing device 1100. These I/O devices/interfaces 1110 may include a mouse, keypad or a keyboard, a touch screen, camera, optical scanner, network interface, modem, other known I/O devices or a combination of such I/O devices/interfaces 1110. The touch screen may be activated with a stylus or a finger.

The I/O devices/interfaces 1110 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1110 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A method comprising:
  receiving a video input and a text transcription of the video input, wherein the video input includes a plurality of frames and the text transcription includes a plurality of sentences;
  generating a segment of a plurality of segments, the segment comprising a video embedding of a video frame of the plurality of frames and a text embedding of a sentence of the plurality of sentences, wherein the video embedding and the text embedding comprise positional information associated with the video frame and the sentence respectively, and wherein a number of video embeddings of the segment is based on a duration between a start time and an end time associated with the sentence of the text embedding;
  determining, by a multimodal summarization model that inputs the plurality of segments, a subset of key frames of the plurality of frames and a subset of key sentences of the plurality of sentences; and
  providing a summary of the video input and a summary of the text transcription based on the subset of key frames and the subset of key sentences.

2. The method of claim 1, further comprising:
  aligning one or more video embeddings corresponding to the plurality of frames with one or more text embeddings corresponding to the plurality of sentences in a temporal domain.

3. The method of claim 2, wherein the aligned one or more video embeddings and the one or more text embeddings is based on a start time and an end time associated with one or more sentences of the plurality of sentences.

4. The method of claim 2, further comprising:
  performing cross-attention on the aligned one or more video embeddings with the one or more text embeddings to fuse the one or more video embeddings and the one or more text embeddings in the temporal domain.

5. The method of claim 4, wherein the cross-attention is performed using an attention mask that attends one or more video-video embeddings, one or more text-text embeddings, and aligned one or more video embeddings and corresponding one or more text embeddings.

6. The method of claim 1, wherein the multimodal summarization model is trained using dual contrastive losses and a classification loss.

7. The method of claim 6, wherein a contrastive loss of the dual contrastive loss is an inter-sample contrastive loss determined using a first frame embedding determined from a first training video, a first text embedding determined from a first text transcription associated with the first training video, a second frame embedding determined from a second training video, and a second text embedding determined from a second text transcription associated with the second training video.

8. The method of claim 6, wherein a contrastive loss of the dual contrastive loss is an intra-sample contrastive loss determined using a first frame embedding determined from a first temporally aligned one or more frames and corresponding one or more text, a first text embedding determined from the first temporally aligned one or more frames and corresponding one or more text, a second frame embedding determined from a second temporally aligned one or more frames and corresponding one or more text, and a second text embedding determined from the second temporally aligned one or more frames and corresponding one or more text.

9. A non-transitory computer-readable medium storing executable instructions, which when executed by a processing device, cause the processing device to perform operations comprising:
  receiving a video input and a text transcription of the video input, wherein the video input includes a plurality of frames and the text transcription includes a plurality of sentences;
  generating a segment of a plurality of segments, the segment comprising a video embedding of a video frame of the plurality of frames and a text embedding of a sentence of the plurality of sentences, wherein the video embedding and the text embedding comprise positional information associated with the video frame and the sentence respectively, and wherein a number of video embeddings of the segment is based on a duration between a start time and an end time associated with the sentence of the text embedding;
  determining, by a multimodal summarization model that inputs the plurality of segments, a subset of key frames of the plurality of frames and a subset of key sentences of the plurality of sentences; and
  providing a summary of the video input and a summary of the text transcription based on the subset of key frames and the subset of key sentences.

10. The non-transitory computer-readable medium of claim 9, storing instructions that further cause the processing device to perform operations comprising:
  aligning one or more video embeddings corresponding to the plurality of frames with one or more text embeddings corresponding to the plurality of sentences in a temporal domain.

11. The non-transitory computer-readable medium of claim 10, wherein the aligned one or more video embeddings and the one or more text embeddings is based on a start time and an end time associated with one or more sentences of the plurality of sentences.

12. The non-transitory computer-readable medium of claim 10, storing instructions that further cause the processing device to perform operations comprising:

performing cross-attention on the aligned one or more video embeddings with the one or more text embeddings to fuse the one or more video embeddings and the one or more text embeddings in the temporal domain.

13. The non-transitory computer-readable medium of claim 12, wherein the cross-attention is performed using an attention mask that attends one or more video-video embeddings, one or more text-text embeddings, and aligned one or more video embeddings and corresponding one or more text embeddings.

14. The non-transitory computer-readable medium of claim 9, wherein the multimodal summarization model is trained using dual contrastive losses.

15. The non-transitory computer-readable medium of claim 14, wherein:

a first contrastive loss of the dual contrastive loss is an inter-sample contrastive loss determined using a first frame embedding determined from a first training video, a first text embedding determined from a first text transcription associated with the first training video, a second frame embedding determined from a second training video, and a second text embedding determined from a second text transcription associated with the second training video, and a second contrastive loss of the dual contrastive loss is an intra-sample contrastive loss determined using a first frame embedding determined from a first temporally aligned one or more frames and corresponding one or more text, a first text embedding determined from the first temporally aligned one or more frames and corresponding one or more text, a second frame embedding determined from a second temporally aligned one or more frames and corresponding one or more text, and a second text embedding determined from the second temporally aligned one or more frames and corresponding one or more text.

16. A system comprising:
a memory component; and
a processing device coupled to the memory component, the processing device to perform operations comprising:

receiving a video input, a text query, and a text transcription of the video input, wherein the video input includes a plurality of frames, and the text transcription includes a plurality of sentences;

generating a segment of a plurality of segments, the segment comprising a video embedding of a video frame of the plurality of frames, a text embedding of a sentence of the plurality of sentences, and a query embedding of the text query, wherein the video embedding and the text embedding comprise positional information associated with the video frame and the sentence respectively, and wherein a number of video embeddings of the segment is based on a duration between a start time and an end time associated with the sentence of the text embedding;

determining, by a multimodal summarization model that inputs the plurality of segments, a subset of key frames of the plurality of frames dependent on the text query and a subset of key sentences of the plurality of sentences dependent on the text query; and providing a query-focused summary of the video input and a query-focused summary of the text transcription based on the subset of key frames and the subset of key sentences.

17. The system of claim 16, wherein the processing device performs further operations comprising:

generating a text query embedding corresponding to the text query, a text embedding corresponding to the text transcription, and a video embedding corresponding to the video input;

concatenating the text query embedding to the text embedding; and concatenating the text query embedding to the video embedding.

18. The system of claim 17, wherein the processing device performs further operations comprising:

aligning the text embedding with the video embedding in a temporal domain.

19. The system of claim 18, wherein the aligned text embedding and video embedding is based on a start time and an end time associated with one or more sentences of the plurality of sentences.

20. The system of claim 19, wherein the text query is a user prompt regarding content included in the video input.

* * * * *